(12) United States Patent
Xekalakis et al.

(10) Patent No.: US 12,511,127 B2
(45) Date of Patent: Dec. 30, 2025

(54) DYNAMIC RECONFIGURATION OF A MULTI-CORE PROCESSOR TO A UNIFIED CORE

(71) Applicant: NVIDIA Corporation, Santa Clara, CA (US)

(72) Inventors: Polychronis Xekalakis, Portland, OR (US); Samuel Charles Tsen, Jr., Portland, OR (US); David Hass, Cupertino, CA (US); Guillermo J. Rozas, Los Gatos, CA (US); Yusuf Cagatay Tekmen, Raleigh, NC (US); Nickolas Andrew Fortino, San Jose, CA (US); Ross Segelken, Portland, OR (US); Michael P. Cornaby, Hillsboro, OR (US); Nikhita Kunati, San Ramon, CA (US); Sean Benton Franey, Portland, OR (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 18/813,657

(22) Filed: Aug. 23, 2024

(65) Prior Publication Data

US 2025/0265092 A1 Aug. 21, 2025

(30) Foreign Application Priority Data

Feb. 19, 2024 (GR) .............................. 20240100127

(51) Int. Cl.
*G06F 9/30* (2018.01)
*G06F 9/38* (2018.01)

(52) U.S. Cl.
CPC .......... *G06F 9/3867* (2013.01); *G06F 9/3009* (2013.01); *G06F 9/3851* (2013.01)

(58) Field of Classification Search
CPC ..... G06F 9/3867; G06F 9/3009; G06F 9/3851
See application file for complete search history.

(56) References Cited

U.S. PATENT DOCUMENTS

| 7,051,329 | B1 | 5/2006 | Boggs et al. | |
| 8,291,201 | B2* | 10/2012 | Schwinn | G06F 9/3873 |
| | | | | 713/323 |
| 9,465,619 | B1* | 10/2016 | Rottenstreich | G06F 9/3836 |
| 10,540,203 | B2* | 1/2020 | Ravindran | G06F 9/4881 |
| 2008/0313438 | A1* | 12/2008 | Luick | G06F 9/3869 |
| | | | | 712/E9.001 |
| 2015/0100965 | A1 | 4/2015 | Tran | |

(Continued)

*Primary Examiner* — Corey S Faherty
(74) *Attorney, Agent, or Firm* — Lowenstein Sandler LLP

(57) ABSTRACT

A first thread is executed in a first pipeline of a first core of an integrated circuit (IC). The first core includes a first set of hardware structures. A second thread is executed in a second pipeline of a second core of the IC. The second core includes a second set of hardware structures. In response to a command to operate the IC with a unified core, the first core is combined with the second core to obtain the unified core. To unify the first core, the first pipeline is unified with the second pipeline to obtain a unified pipeline, and the first set of hardware structures is unified with the second set of hardware structures to obtain a unified set of hardware structures. A single thread is executed in the unified pipeline of the unified core using the unified set of hardware structures.

21 Claims, 10 Drawing Sheets

(56) References Cited

U.S. PATENT DOCUMENTS

| | | | |
|---|---|---|---|
| 2019/0042266 A1* | 2/2019 | Mueller | G06F 9/30123 |
| 2023/0229623 A1 | 7/2023 | Prabhakar et al. | |
| 2023/0385114 A1 | 11/2023 | Mody et al. | |

* cited by examiner

DYNAMIC RECONFIGURATION OF A MULTI-CORE PROCESSOR TO A UNIFIED CORE

CROSS-REFERENCE TO RELATED APPLICATIONS

This application claims the benefit of priority to Greek patent application No. 20240100127, entitled, "DYNAMIC RECONFIGURATION OF A MULTI-CORE PROCESSOR TO A UNIFIED CORE," filed on Feb. 19, 2024, which is incorporated by reference herein in its entirety.

TECHNICAL FIELD

Embodiments of the present disclosure generally relate to a processor, and more specifically, relate to reconfiguration of a processor from a unified core to multiple cores or from multiple cores to a unified core.

BACKGROUND

High-performance central processing unit (CPU) cores often improve performance at the expense of an increased chip area occupied by the CPU cores. The performance of CPU cores relative to the size of their die area can be improved.

DETAILED DESCRIPTION

Figure 1A:
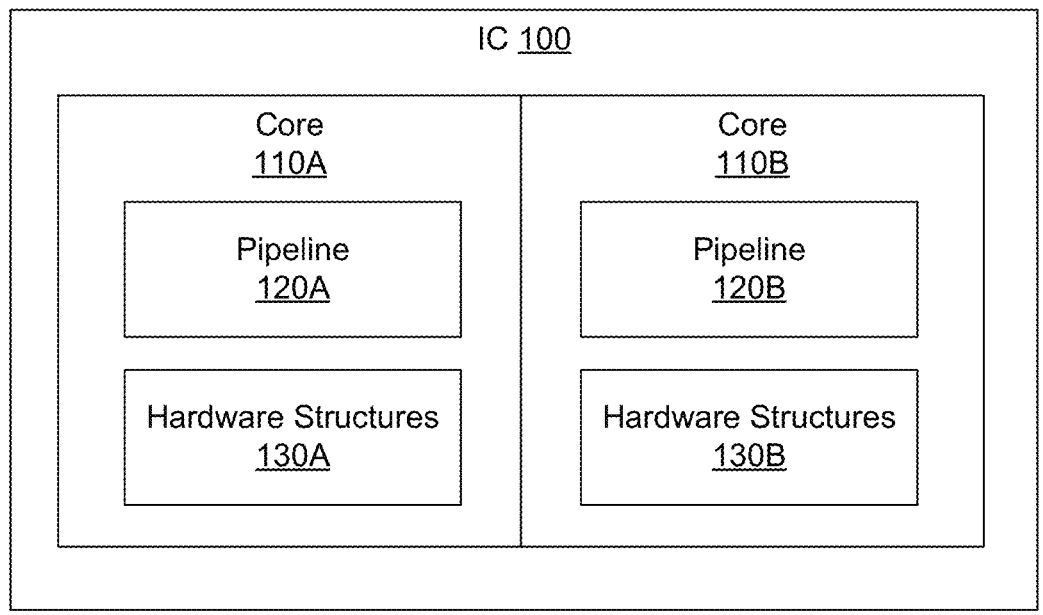
FIG. 1A illustrates a block diagram of an integrated circuit (IC) operating two cores, in accordance with aspects and implementations of the present disclosure.

Modern CPU cores continually evolve to extract more performance through various techniques. In many instances, high-performance processing cores extract performance at the expense of area and power. For example, high-performance processing cores can add further hardware resources (e.g., execution units, caches, interconnects, etc.), increasing an overall die area utilized by the processing core with diminishing performance improvements. Accordingly, some high-performance CPU cores can be inefficient in terms of performance extracted per square millimeter (mm) of die area and performance per watt.

Conventional techniques leverage a capability known as simultaneous multithreading (SMT) or hyper-threading to extract additional performance by executing multiple processes (e.g., threads) on a single processing core. For example, a single-core CPU may be capable of executing two threads by utilizing SMT techniques. However, conventional SMT techniques have a number of drawbacks and can cause design and architectural issues. For example, conventional SMT techniques share and dynamically assign resources (e.g., execution units, pipeline stages, register files, etc.) between threads executing on the same processing core. In addition, CPUs that employ SMT can be left susceptible to side-channel attacks that exploit such dynamic sharing and assignment of resources to effectively retrieve data that should not be accessible to other threads running on the same core.

In an additional example, dynamic resource sharing, implemented by conventional SMT, can cause a thread (e.g., a sequence of instructions) to negatively affect the performance of another thread running on the same CPU core. For example, if multiple threads simultaneously compete for the same resources, it can potentially degrade performance and introduce stalls, thereby reducing overall efficiency of the CPU core.

In yet another example, design complications can arise from SMT CPU cores sharing pipelines and hardware structures in a CPU core. Specifically, sharing pipelines and hardware structures can lead to deadlocks (e.g., multiple threads blocked indefinitely as each wait for resources held by the other), livelocks (e.g., multiple threads are executing but cannot make progress due to conflicts with other threads), and starvation issues (e.g., one thread consistently uses fewer resources than another thread). Such issues can be resolved by carefully designing resource allocation, threads scheduling, and management of dependencies. Designing such mechanisms can be challenging and introduce significant overhead in terms of design complexity. Accordingly, adding additional performance features to SMT CPU cores can be a significant hurdle for CPU designers.

Aspects and implementations of the present disclosure address the above deficiencies and other deficiencies of conventional SMT CPU systems by providing a technique that enables a processor to dynamically reconfigure between a multi-core processor (e.g., executing threads on multiple cores) and a unified core processor (e.g., executing a single thread on a unified core). A multi-core processor can incorporate two or more independent processing units (e.g., cores) on a single die. Each core can execute a thread (e.g., a process, a sequence of instructions, etc.) independently, allowing for parallel execution of multiple threads. Aspects and implementations of the present disclosure enable static partitioning of resources (e.g., hardware structures, pipelines, etc.) between the cores. In one implementation, the processor can be dynamically reconfigured as a unified core processor. A unified core can be a single core that performs all computational tasks of the processor by executing a single thread on the unified core. The unified core can be a unification of multiple smaller cores. For example, the unified core can unify pipelines and hardware structures associated with multiple cores.

In at least one embodiment, the processor can be dynamically reconfigured from a multiple-core processor (also referred to as "multi-core mode" or "multi-thread mode" herein) to a unified-core processor (also referred to as "unified-core mode" or "single-thread mode" herein). For example, the processor can execute a first thread on a first pipeline in a first core of the processor and execute a second thread on a second pipeline in a second core of the processor. In response to a command to reconfigure to a unified core, the processor can flush the first and second pipeline to prepare for the unification of the first core and the second core. The command can be received from system software of the processor. In at least one embodiment, the command can be received from firmware such as a Basic Input/Output System (BIOS). In at least one embodiment, the command can be received from an application or other software source. In at least one embodiment, a hardware component can detect a condition that causes the processor to be reconfigured to a unified core. For example, the hardware component can detect that the second core has been in an inactive state for more than threshold number of clock cycles and, as a result, cause the processor to be reconfigured to a unified core. To unify the cores, the processor can unify the first pipeline with the second pipeline to obtain a unified pipeline and unify the first set of hardware structures with the second set of hardware structures to obtain a unified set of hardware structures. The processor can execute a single thread (e.g., an active thread) on the unified core using the unified pipeline.

In some embodiments, the command to operate the processor with the unified core can be issued in response to a determination that the second core has been inactive for more than a threshold number (e.g., 50) of clock cycles. For example, the processor can receive an instruction (e.g., a wait-for-interrupt (WFI) instruction, a HALT instruction, etc.) that indicates the second thread is transitioning to an inactive state from the system software of the processor, causing the core (or the thread executing on the core) to enter an inactive state. An inactive state means that the core is not currently executing any instructions (e.g., not executing a thread) or performing any tasks. This can be advantageous because unifying the core can enable a single thread to achieve greater peak performance by executing on wider unified core rather than executing on an ununified core of the multi-core processor. When one of the cores is inactive, this can significantly increase the performance of the remaining active thread. For example, a first thread can execute on the first core at a rate of N instructions per cycle (N-wide), and a second thread can execute on the second core at a rate of N instructions per cycle (N-wide). When one of the threads/cores enters an inactive state, pipelines and hardware structures can be unified to obtain a 2N-wide unified core capable of executing the remaining active thread on a unified pipeline at a rate of 2N instructions per cycle.

In at least one embodiment, the processor can be dynamically reconfigured from a unified-core processor to a multi-core processor. For example, the processor can execute a first thread on a unified pipeline of a unified core of the processor. In response to a command, such as a command received from a system software (e.g., an operating system (OS), hypervisor, firmware, BIOS, etc.), to reconfigure to a multicore processor, the processor can flush the unified pipeline to prepare for partitioning the unified core. To partition the unified core, the processor can statically partition the unified pipeline to obtain a first pipeline and a second pipeline and partition a unified set of hardware structures of the unified core to a first set of hardware structures and a second set of hardware structures. The processor can execute a first thread on the first core and a second thread on the second core. In at least one embodiment, the sets of hardware structures can include cache, translation lookaside buffers (TLB), register files, queues, branch predictors, branch target buffers, execution units, schedulers, and the like. Statically partitioned resources (e.g., hardware structures, pipelines, etc.) can allow separate threads to operate independently on a respective core of the processor with minimal interaction and little resource sharing.

In some embodiments, the command to operate the processor with multiple cores can be issued in response to a reception of an interrupt from the system software or the IC hardware indicating that a second thread is prepared to execute on the processor. For example, the processor can receive an interrupt from the OS that causes an inactive thread to become active ("wake up"). When the inactive thread wakes up, this can significantly increase the efficiency, throughput, and performance of the processor by allowing the processor to independently execute multiple threads on the processor in parallel. For example, a first thread can execute on the unified core at a rate of 2N instructions per cycle (2N-wide) but may not have a workload that can exploit the entire width of the unified core. When the second thread wakes up, pipelines and hardware structures can be statically partitioned to obtain a first N-wide core and a second N-wide core capable of executing the first thread and the second thread, respectively, on partitioned pipelines at a rate of N instructions per cycle and may be able to exploit the width of the partitioned pipeline more easily than the width of a combined pipeline. Thereby improving overall efficiency (e.g., performance per area, performance per watt, etc.), throughput, and performance.

Advantages of the technology disclosed herein include, but are not limited to, increased frequency of the processor by reducing critical paths of the design and logic to select which thread will use which pipeline in a given cycle. This can be accomplished by statically partitioning pipelines such that each thread can execute on an independent pipeline with minimal resource sharing between the threads. Such static pipeline partitions can utilize entire clock cycles to progress instructions in contrast with conventional SMT approaches that use a part of each clock cycle to decide which thread will run on given pipeline for a given cycle. Additionally, statically partitioning hardware structures (e.g., caches, branch predictors, etc.) can negate performance variability issues and security concerns associated with conventional SMT design resource sharing. For example, by statically partitioning structures and pipelines, deadlocks, livelock, starvation issues, and other issues associated with convention SMT can be avoided due to minimal interaction and resource sharing between threads. In another example, due to minimal resource sharing and increased thread isolation, it can be difficult to orchestrate certain attacks (e.g., side channel attacks) typically employed against conventional SMT designs. Thus, the technical effect of the present disclosure may additionally include a more secure multi-threaded processor that limits or prevents extraction of data (e.g., via a side channel attack) associated with processors that share resources between multiple threads executing on the processor. Accordingly, aspects and implementations of the present disclosure can provide the flexibility of transitioning between executing multiple threads and a single thread on a processor while avoiding the drawbacks of conventional SMT designs.

It should be noted that various aspects of the above referenced methods and systems are described in detail herein below by way of example, rather than by way of limitation. The embodiments and examples provided below may reference a dual-core processor configuration that can be reconfigured into a unified core for the purpose of simplicity and brevity only. However, embodiments and examples of the present disclosure can be applied generally to multi-core processors with any number of cores and to an integrated circuit (IC) configuration with multiple multi-core processors capable of transitioning between a multi-core mode a unified-core mode. For example, when describing pipeline depths and widths for dual-core embodiments, the factor of two may be used for simplicity, but not by way of limitation. For N-core embodiments, the factor may be generalized to any value between 2 and N, inclusive.

FIG. 1A illustrates a block diagram of an integrated circuit 100 (IC 100) operating two cores, in accordance with aspects and implementations of the present disclosure. The IC 100 can be general-purpose computing equipment (a CPU, a graphics processing unit (GPU), etc.), specialized computing equipment (field-programmable gate array (FPGA), application-specific integrated circuit (ASIC), etc.), and the like. The IC 100 is also referred to herein as a processor 100 by way of illustration, and not by way of limitation, noting that aspects and embodiment of the present disclosure can be applied to a variety of computing equipment such as those mentioned above.

As illustrated, the IC 100 includes a core 110A and a core 110B packaged on the same die. The core 110A and the core 110B can each include separate pipelines. The core 110A can implement a pipeline 120A, and the core 110B can implement a pipeline 120B. The cores 110A and 110B and their respective pipelines can be statically split such that each core independently executes a separate sequence of instructions in parallel. For example, the core 110A can execute a first thread (e.g., a first sequence of instructions) on the pipeline 120A, and the core 110B can execute a second thread (e.g., a second sequence of instructions) on the pipeline 120B, such that the first thread does not affect the second thread executing on the core 110B and the second thread does not affect the first thread executing on the core 110A. In an illustrative example, the core 110A can independently execute a first thread on an N-wide pipeline 120A at a bandwidth of N instructions per cycle. The core 110B can independently execute a second thread on a N-wide pipeline 120B at a bandwidth of N instructions per cycle.

The core 110A includes a set of hardware structures 130A, and the core 110B includes a set of hardware structures 130B. The set of hardware structures 130A and 130B can each include one or more caches (e.g., L1 caches, L2 caches, etc.), buffers (e.g., translation lookaside buffers, branch target buffers, DCache miss trackers (DCMTs), write combining buffers (WCBs), etc.), queues (e.g., load replay queues, issue queues, prefetch queues, etc.), register files, branch predictors, execution units, schedulers, and the like, as described in detail below with respect to FIG. 2, FIG. 3, and FIG. 4. As illustrated the hardware structures 130A and 130B disposed on the IC 100 can be statically partitioned between the core 110A and the core 110B, respectively.

Figure 1B:
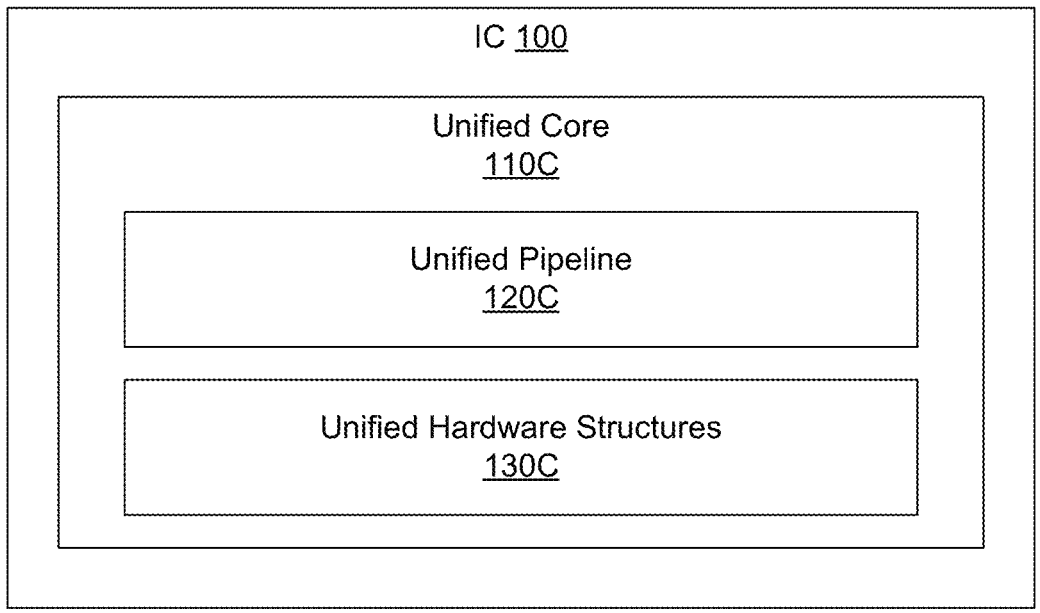
FIG. 1B illustrates a block diagram of an IC operating a unified core, in accordance with aspects and implementations of the present disclosure.

FIG. 1B illustrates a block diagram of an IC 100 operating a unified core 110C, in accordance with aspects and implementations of the present disclosure. The unified core 110C includes a unified pipeline 120C and a set of unified hardware structures 130C. The unified pipeline 120C can be a combination of pipeline 120A and pipeline 120B such that the IC 100 can execute a thread on a wider pipeline than the pipeline 120A and 120B individually. For example, the core 110A can independently execute a first thread on an N-wide pipeline 120A at a rate of up to N instructions per cycle, and the core 110B can independently execute a second thread on an N-wide pipeline 120B at a rate of N instructions per cycle. The unified core 110C can execute the first thread, the second thread, or any other thread on a 2N-wide unified pipeline 120C at a rate of 2N instruction per cycle.

The set of unified hardware structures 130C can include one or more caches (e.g., L1 caches, L2 caches, etc.), buffers (e.g., translation lookaside buffers, branch target buffers, DCMTs, WCBs, etc.), queues (e.g., load replay queues, issue queues, prefetch queues, etc.), register files, branch predictors, execution units, schedulers, and the like. The unified hardware structures 130C can include the hardware structures 130A and 130B such that the unified core 110C can utilize a full portion of hardware structures disposed on the IC. For example, IC 100 can include a cache (e.g., an L1 instruction cache, an L1 data cache, etc.). The unified core 110C can write/allocate, read, and otherwise access the entirety of the cache disposed on the IC 100.

Figure 6:
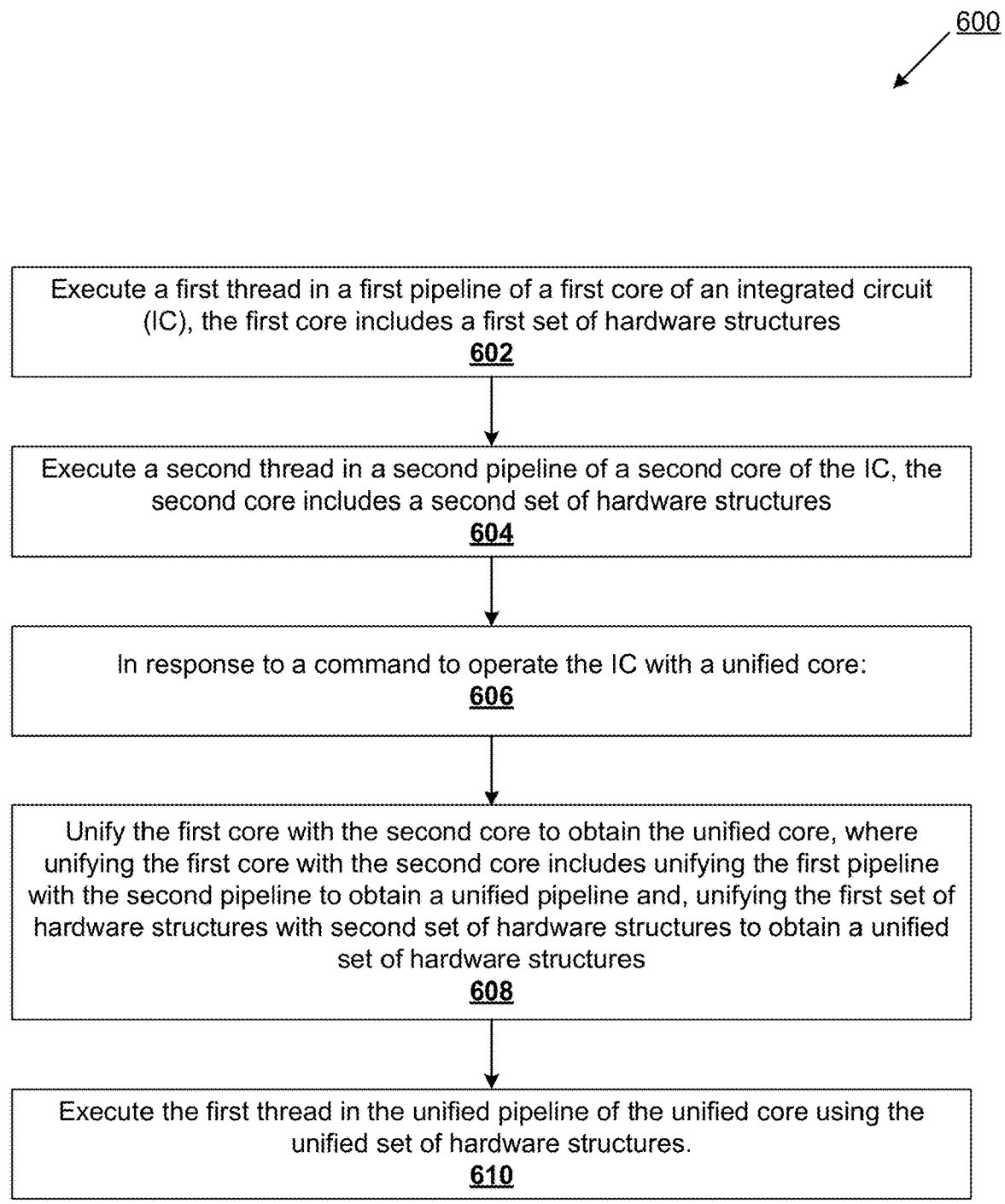
FIG. 6 illustrates a flow diagram of an example method of dynamic reconfiguration of a processor from multiple cores to a unified core, in accordance with aspects and embodiments of the present disclosure.

In at least one embodiment, the IC 100 can dynamically transition (e.g., in response to a command) from the multi-core configuration illustrated with respect to FIG. 1A to the unified-core configuration illustrated with respect to FIG. 1B, as described in detail with respect to FIG. 6. In at least one embodiment, the IC 100 can dynamically transition (e.g., in response to a command) from the unified-core configuration of FIG. 1B to the multi-core configuration of FIG. 1A, as described in detail below with respect to FIG. 7. The IC 100 configuration of FIG. 1A is referred to herein as "multi-thread mode," "multi-core mode," and "processor operating with two threads active," noting that each refers to an IC 100 (e.g., a processor) with multiple cores configured to execute a separate thread on a respective pipeline using a respective set of hardware resources, where the pipelines and hardware structures are statically partitioned on a per-core or a per-thread basis. The IC 100 configuration of FIG. 1B is referred to herein as "single-thread mode," "combined core," "unified core," "super core," and "processor operating with one thread active," noting that each refers to an IC 100 (e.g., a processor) with a single, unified core configured to execute a thread on a unified pipeline using a respective set of unified hardware structures.

Figure 1C:
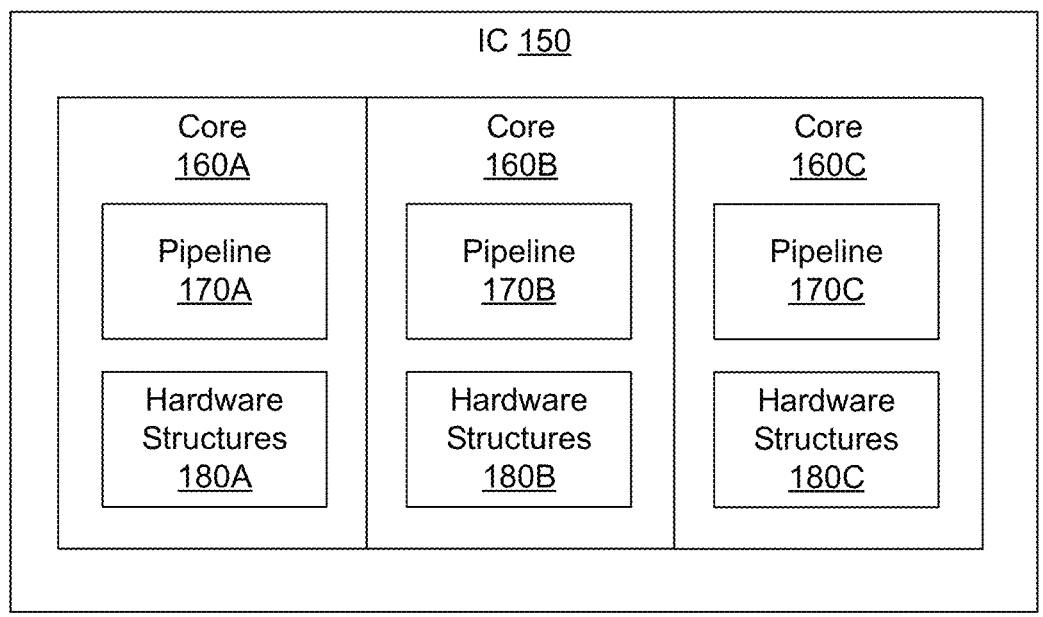
FIG. 1C illustrates a block diagram of an IC operating three cores, in accordance with aspects and implementations of the present disclosure.

FIG. 1C illustrates a block diagram of an IC 150 operating three cores, in accordance with aspects and implementations of the present disclosure. the IC 100 includes a core 160A, a core 160B, and a core 160C packaged on the same die. The cores 160A-C can each include separate pipelines. The core 160A can implement a pipeline 170A, the core 160B can implement a pipeline 170B, and the core 160C can implement a pipeline 170C. The cores 160A-C and their respective pipelines can be statically split such that each core independently executes a separate sequence of instructions in parallel. The cores 160A-C can each include separate hardware structures. The core 160A includes a set of hardware structures 180A, the core 160B includes a set of hardware structures 180B, and the core 160C includes a set of hardware structures 180C. The hardware structures 180A, 180B, and 180C can be statically partitioned between the core 160A, the core 160B, and the core 160C, respectively.

Figure 1D:
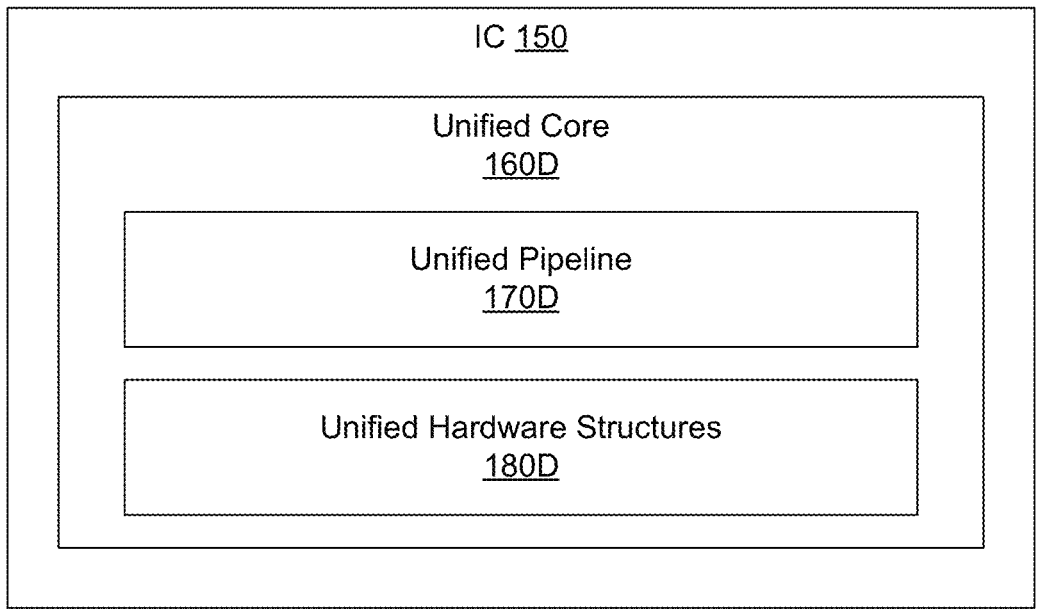
FIG. 1D illustrates a block diagram of an IC operating a unified core, in accordance with aspects and implementations of the present disclosure.

FIG. 1D illustrates a block diagram of an IC 150 operating a unified core 160D, in accordance with aspects and implementations of the present disclosure. The unified core 160D includes a unified pipeline 170D and a set of unified hardware structures 180D. The unified pipeline 170D can be a combination of pipelines 170A-C such that the IC 100 can execute a thread on a wider pipeline than the pipelines 170A-C individually. The set of unified hardware structures 180D can be a combination of hardware structures 180A-C.

The same technique of dynamically transitioning the IC 100 between two cores and a unified core can be applied to reconfiguring the IC 150 between three cores and a unified core. In at least one embodiment, aspects and embodiments of the present disclosure can implement more than three cores that are reconfigurable to a unified core. For example, an IC can include four cores that are reconfigurable to unified core. Accordingly, aspects and embodiments of the present disclosure can be generally applied to multi-core configurations that are capable of reconfiguring to a unified core.

Figure 1E:
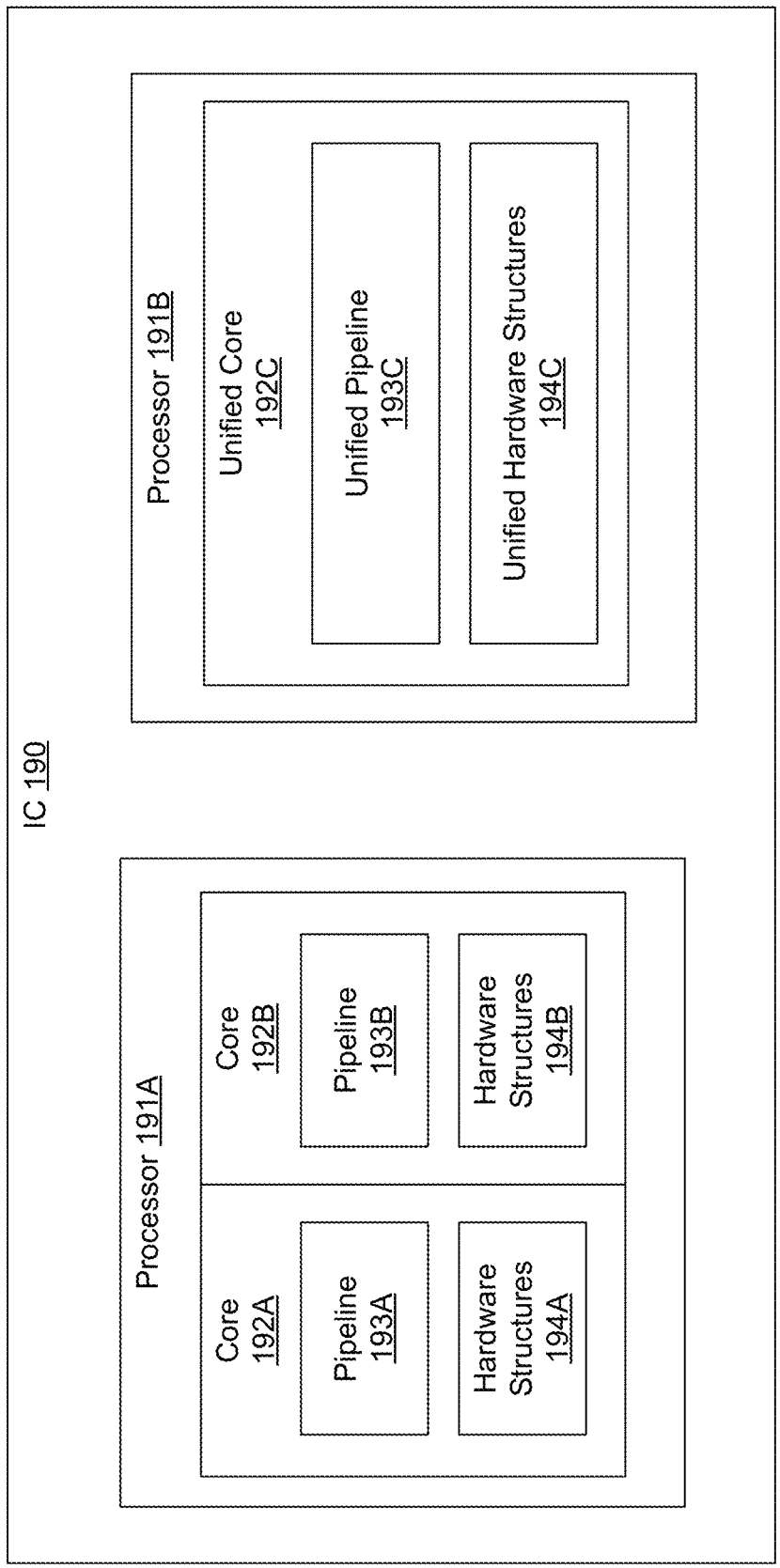
FIG. 1E illustrates a block diagram of an IC including a processor configured as separate cores and a processor configured as a unified core, in accordance with aspects and implementations of the present disclosure.

FIG. 1E illustrates a block diagram of an IC 190 including a processor 191A configured as a separate cores and a processor 191B configured as a unified core. The processor 191A includes a core 192A and a core 192B packaged on the same processor 191A. The core 192A can include a pipeline 193A and hardware structures 194A. The core 192B can include a pipeline 193B and hardware structures 194B. The cores 192A and 192B and their respective pipelines and hardware structures can be statically split such that each core independently executes a separate sequence of instructions in parallel. In at least one embodiment, the processor 191A can be reconfigured to a unified core, in accordance with aspects and implementations of the present disclosure.

The processor 191B can include a unified core 192C with a unified pipeline 193C and unified hardware structures 194C. The unified pipeline 192C can be a combination of pipelines The set of unified hardware structures 194C can be a combination of hardware structures. In at least one embodiment, the processor 191B can be reconfigured as separate cores, in accordance with aspects and implementations of the present disclosure. It can be noted that some embodiments can be extended to many (e.g., two or more) processors, such as processor 191A and processor 191B, disposed on an IC 190. The processors can be configured as a unified core or separate cores to form an IC 190 that may adapt to changing workloads.

Hardware structures described herein, such as hardware structures described below with respect to FIGS. 3 through 5 can be partitioned according to one or more methodologies. In at least one embodiment, a subset of hardware structures can be managed using wrap points or wrapping pointers. A wrap point refers to an entry within a cyclical buffer where a subsequent insertion or read to the buffer will wrap back to the beginning of the buffer to reuse memory space. For example, hardware structures described herein can include one or more cyclical buffers, such as a reorder buffer. The ROB can be a cyclical first-in, first-out (FIFO) buffer to track out-of-order execution of instructions and ensure instructions are retired in order. In an illustrative example, when the processor is operating with one thread active on the unified core, the ROB can be a cyclical queue with a head pointer and a tail pointer. The oldest instruction is pointed to by the head pointer, and new instructions are added to the ROB at an entry pointed to by the tail pointer. When an instruction is added to the ROB 434, the tail pointer advances to the next available entry. When an instruction is retired, the head pointer advances to reference the next instructions in the ROB. A wrap point of the ROB can be located at the end of the ROB. The wrap point of the ROB can refer to a specific location (e.g., the end of the ROB) within the ROB, where the indexing of the ROB 434 resets to the beginning. In at least one embodiment, when the processor reconfigures from multiple threads active to one thread active or from one thread active to multiple threads active, wrap points of the ROB can be modified to statically partition the ROB. For example, when the processor reconfigures from one thread active to two threads active (such as in a dual-core embodiment), head and tail pointers associated with the first thread can begin at the first entry of the ROB and wrap at a halfway point of the ROB back to the first entry of the ROB. Head and tail pointers associated with the second thread can begin at the halfway point of the ROB and wrap at the last entry of the ROB back to the halfway point of the ROB. It is appreciated that the ROB is used herein by way of example, and not by way of limitation, noting that other circular structures herein may be similarly partitioned using wrapping pointers.

In at least one embodiment, dynamically allocated, random-access structures, such as a subset of caches and/or translation lookaside buffers described herein, can be partitioned into pre-defined patterns (also referred to as "partitioned by way" herein). For example, when a processor is operating with two threads active, an L1 instruction cache be statically partitioned into a first partition and a second partition of equal or unequal size. When the processor is operating in multi-thread mode, a first thread may write and allocate to L1 instruction cache entries within the first partition, and a second thread may write and allocate to L1 instruction cache entries within the second partition. It is appreciated that the L1 instruction cache is used herein by way of example, and not by way of limitation, noting that other dynamically allocated, random-access structures described herein may be similarly partitioned by way.

In at least one embodiment, a subset of HW structures described in the previous paragraph may be configured such that multiple threads may read from the entirety of the subset of HW structures while operating in multi-core mode. For example, dynamically allocated, random-access structures (e.g., caches, TLBs, etc.) may be configured such that multiple threads may have read access. In at least one embodiment, another subset of HW structures (e.g., branch predictors, register files, etc.) may be configured such that only an associated thread may read from a corresponding partitioned portion of the HW structures.

Because the L1 instruction cache, for example, is partitioned such that multiple threads have read access, the first thread and the second thread can read from the L1 instruction cache in parallel. For example, if either of the threads misses in the L1 instruction cache, a request can be sent to a second-level cache within a memory subsystem to retrieve the data. In at least one embodiment, an instruction fetch unit (IFU) can interface with the memory subsystem over a single bus. In some instances, the first thread and the second thread can simultaneously miss on the L1 instruction cache and, as a result, a conflict can occur over the bus to the memory subsystem. In at least one embodiment, the IFU can resolve such conflicts using an arbitration scheme (e.g., round-robin arbitration) that does not allow interaction between threads. For example, on a first occasion, when the threads simultaneously request access to the memory subsystem over the bus, the IFU can assign priority to the first thread. On a second occasion, when the threads simultaneously request access to the memory subsystem over the bus, the IFU 310 can assign priority to the second thread, and so forth. The IFU can accordingly arbitrate access to the memory subsystem over a single, shared bus in a time-multiplexed manner. In at least one embodiment, the IFU 310 can interface with the memory subsystem over multiple buses. For example, a first bus can be dedicated to the first thread, and the second bus can be dedicated to the second thread. It is appreciated that arbitration of request busses between caches is used herein by way of example, and not by way of limitation, noting that the above-described arbitration scheme(s) can generally be applied to any busses (e.g., request busses, response busses, etc.) in which multiple components may contend for to access a shared resource.

In at least one embodiment, random-access structures, such as register files, can be partitioned by bank. For example, when a processor is operating with one thread active, that thread can use both banks to access all registers, avoiding port conflicts to different banks. When the processor is operating with two threads active, each bank can be dedicated to a thread, thereby eliminating cross-thread port conflicts. This partitioning by bank can apply to other random access structures in the processor.

Figure 2:
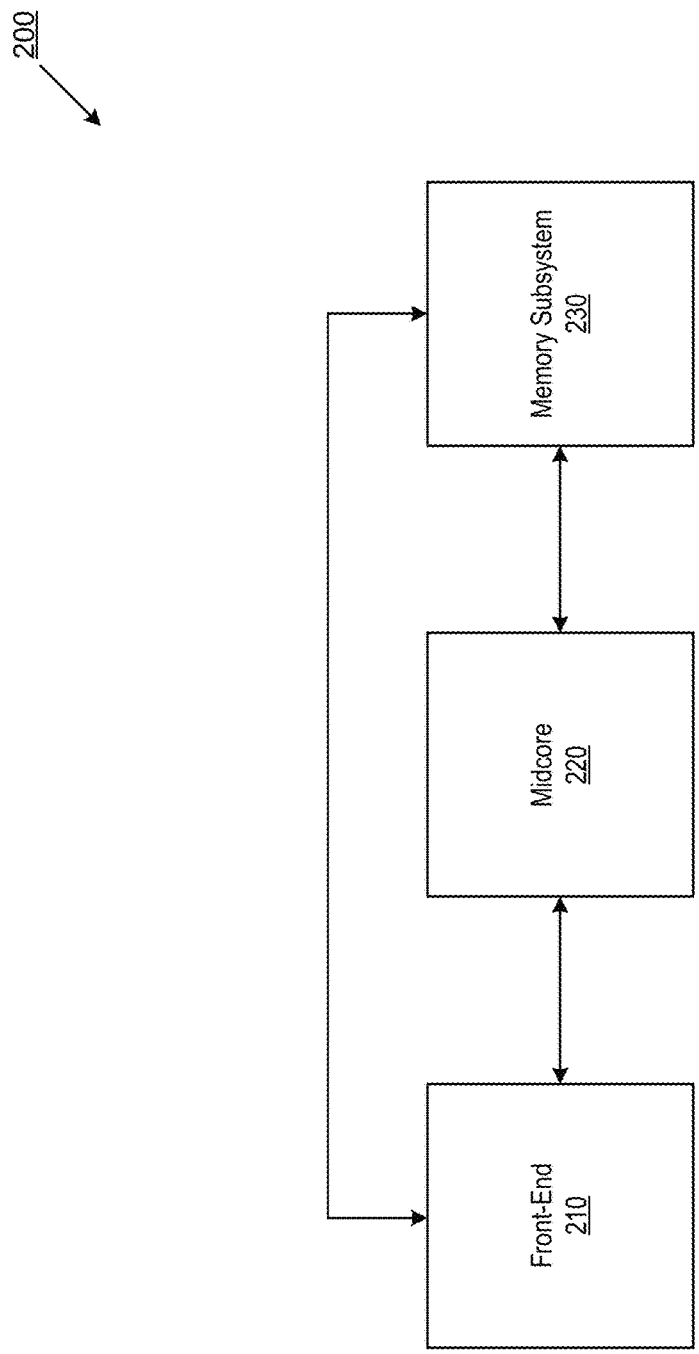
FIG. 2 illustrates a block diagram of a processor, in accordance with aspects and implementations of the present disclosure.

FIG. 2 illustrates a block diagram of processor 200 including a front-end 210, a midcore 220, and a memory subsystem 230, in accordance with aspects and implementations of the present disclosure. The processor 200 can implement pipelined processing to fetch, decode, and execute instructions from memory, as described in detail below. In at least one embodiment, the processor 200 can operate in a single-thread mode or a multi-thread mode. When operating in single-thread mode, the processor 200 can operate a single-thread at the full width of the processor 200. When operating in multi-thread mode, the processor 200 can operate multiple threads at a reduced width. To achieve thread isolation between multiple threads, structures and data paths can be statically partitioned between the threads such that each thread processes instructions in separate pipelines.

Branch Prediction

Figure 3:
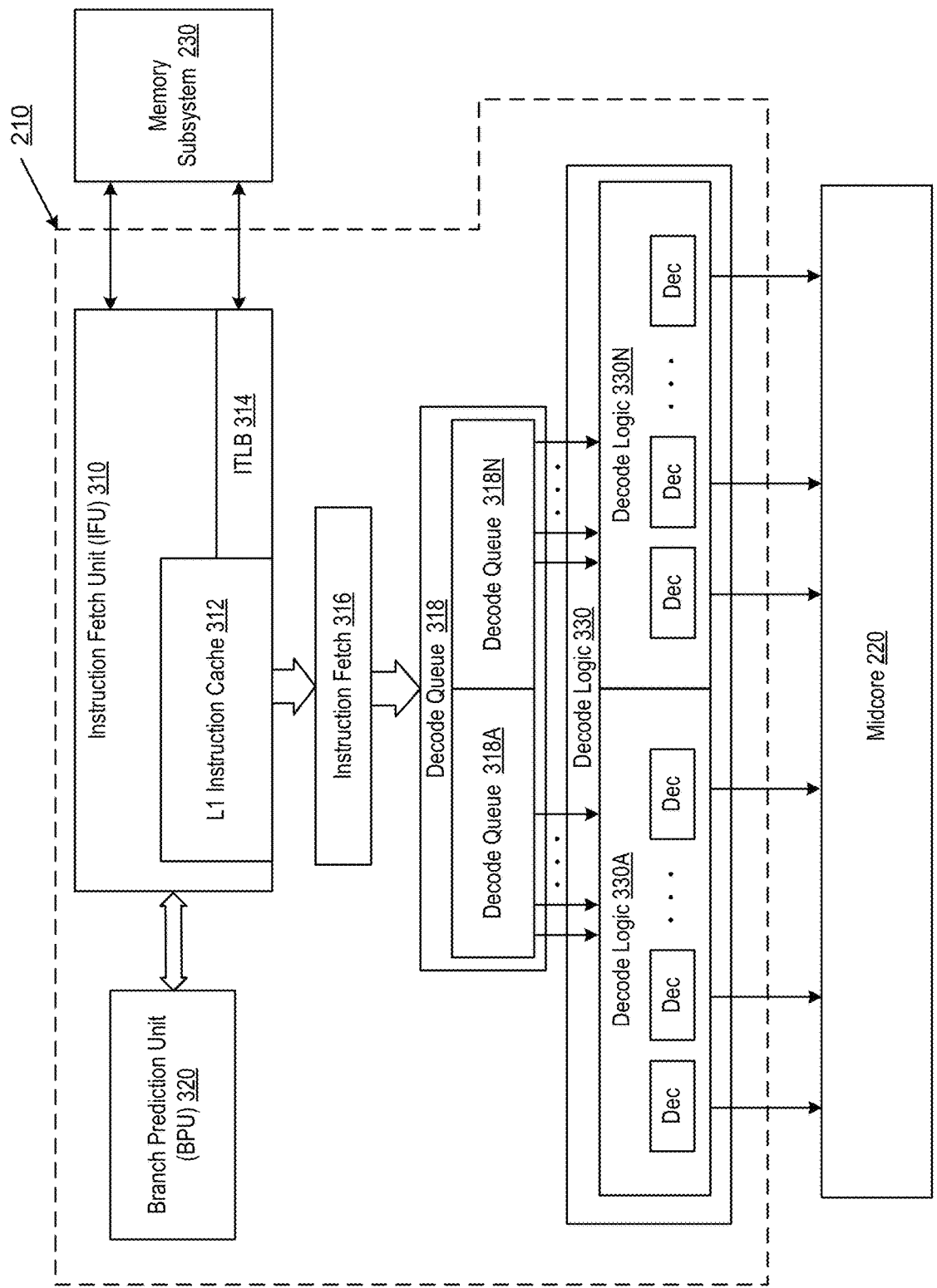
FIG. 3 illustrates a block diagram of a front-end of a processor, in accordance with aspects and embodiments of the present disclosure.

FIG. 3 illustrates a block diagram of a front-end 210 of a processor (e.g., a processor 200), in accordance with aspects and embodiments of the present disclosure. The front-end 210 of the processor (e.g., processor 200 of FIG. 2) includes a branch prediction unit 320 (BPU 320) to predict whether a branch will be taken or not taken. A branch is a type of action that alters an execution path and determines a set of instructions to be executed next. Branches can occur as a result of instructions such as conditional branches, jumps, unconditional branches, and the like. The BPU 320 can include a collection of various predictors and branch target buffers (BTBs). In at least one embodiment, each component (each branch predictor, each buffer, etc.) of the BPU 320 can be statically partitioned according to one or more of the methods described above with respect to FIG. 1E, such that each thread is associated with a separate branch prediction pipeline. Accordingly, each thread can issue mis-predicts, invalidate instructions, flush its corresponding BPU pipeline, issue updates, etc., without affecting the other thread. When the processor is operating a single thread on a unified core, the unified core can utilize the entire BPU pipeline of the processor and the entirety of any predictor structure (predictors, BTBs, etc.).

Instruction Fetch

The front-end 210 includes an instruction fetch unit 310 (IFU 310) to fetch instructions from memory and deliver instructions to subsequent stages of a processor (e.g., processor 200 or IC 100). In at least one embodiment, the IFU 310 can maintain a register (referred to as a "program counter (PC)" herein) to manage addresses of instructions to be executed by the processor. The IFU 310 can increment the PC to reference the next instruction to be fetched in a sequence of instructions or update the PC based on certain instructions such as branches, jumps, and the like. In at least one embodiment, the IFU 310 can fetch instructions from a main memory, such as a dynamic random-access memory (not illustrated). In at least one embodiment, the IFU 310 can fetch instruction from other memories of a memory hierarchy. For example, the IFU 310 can fetch instructions from an L1 instruction cache 312, located on the processor, or a memory subsystem (e.g., memory subsystem 230).

In at least one embodiment, the IFU 310 includes an L1 instruction cache 312 for temporarily storing frequently accessed instructions. For example, the IFU 310 can store an instruction in the L1 instruction cache 312. Rather than subsequently reading the instruction from main memory, the instruction can be fetched from the L1 instruction cache 312. The L1 instruction cache 312 can operate based on spatial and/or temporal locality of instructions to reduce latency associated with accessing main memory to retrieve instructions.

In at least one embodiment, the IFU 310 includes an instruction translation lookaside buffer 314 (ITLB 314). The ITLB 314 is a hardware buffer used to cache virtual-to-physical address translations of instructions. The ITLB 314 stores mappings between virtual instruction addresses and corresponding physical addresses associated with instructions fetched by the IFU 310. When the IFU 310 fetches an instruction from memory, the IFU 310 can first check the ITLB 314. If the IFU 310 determines that a virtual-to-physical mapping for the instruction is stored in the ITLB 314, the IFU 310 can retrieve a physical address corresponding to the instruction from the ITLB 314. If the IFU 310 determines that the virtual-to-physical mapping is not stored in the ITLB 314, the processor can retrieve the physical address from the memory subsystem. In at least one embodiment, the L1 instruction cache 312, the ITLB 314, and the instruction fetch 316 pipeline generally can be statically partitioned and/or unified, according to one or more of the methodologies described above.

Decode

Instructions fetched by the IFU 310 at instruction fetch 316 are provided to a decode queue 318 for instruction decode. The front-end 210 of the processor includes a decode queue 318 operatively coupled to receive instructions from instruction fetch 316. The decode queue 318 can be a hardware structure (e.g., a first-in-first-out (FIFO) queue) to store instructions prior to instruction decode. In at least one embodiment, the decode queue 318 can be statically split into a decode queue 318A and a decode queue 318N.

The front-end 210 of the processor includes decode logic 330 operatively coupled to receive instructions from decode queue 318 and decode the fetched instructions. The instructions can be executed by execution units of the processor at a later point in the pipeline. In at least one embodiment, the decode logic 330 can be statically split into decode logic 330A and decode logic 330N. In multi-thread mode, the decode logic 330A can decode instructions read from decode queue 318A the decode logic 330N can decode instructions read from the decode queue 318N. In single-thread mode, the decode logic 330A and the decode logic 330N can be unified, and the active thread and the unified decode logic can decode instructions read from the unified decode queue. For example, when the processor 200 is in multi-thread mode, the decode logic 330A can decode instructions associated with a first thread (i.e., received from decode queue 318A) at a rate of N instructions per cycle (N-wide). The decode logic 330N can decode instructions associated with a second thread (i.e., received from decode queue 318N) at a rate of N instructions per cycle (N-wide). When the processor 200 is operating in single-thread mode, decode logic 330A and decode logic 330N can be unified such that the unified decode logic can decode instructions associated with the active thread at an increased rate. For example, the unified decode logic decodes instructions at a rate of 2*N instruction per cycle (2*N-wide).

Because the decode logic 330A and 330N are statically partitioned, the first thread and the second thread can operate independently from each other when the processor 200 is in multi-thread mode. For example, if decode logic 330A receives backpressure from a later stage of its pipeline (e.g., from a rename stage) that prevents the first thread from proceeding, the second thread can continue operating as both threads have separate data paths in an instruction decode and throughout other stages of the processor 200. The decode logic 330A-N are operatively coupled to send decoded instructions to the midcore 220 of the processor for rename, execution, etc. It is appreciated that other pipelines (e.g., fetch, issue, execute, etc.) can be similarly partitioned/combined.

Rename

Figure 4:
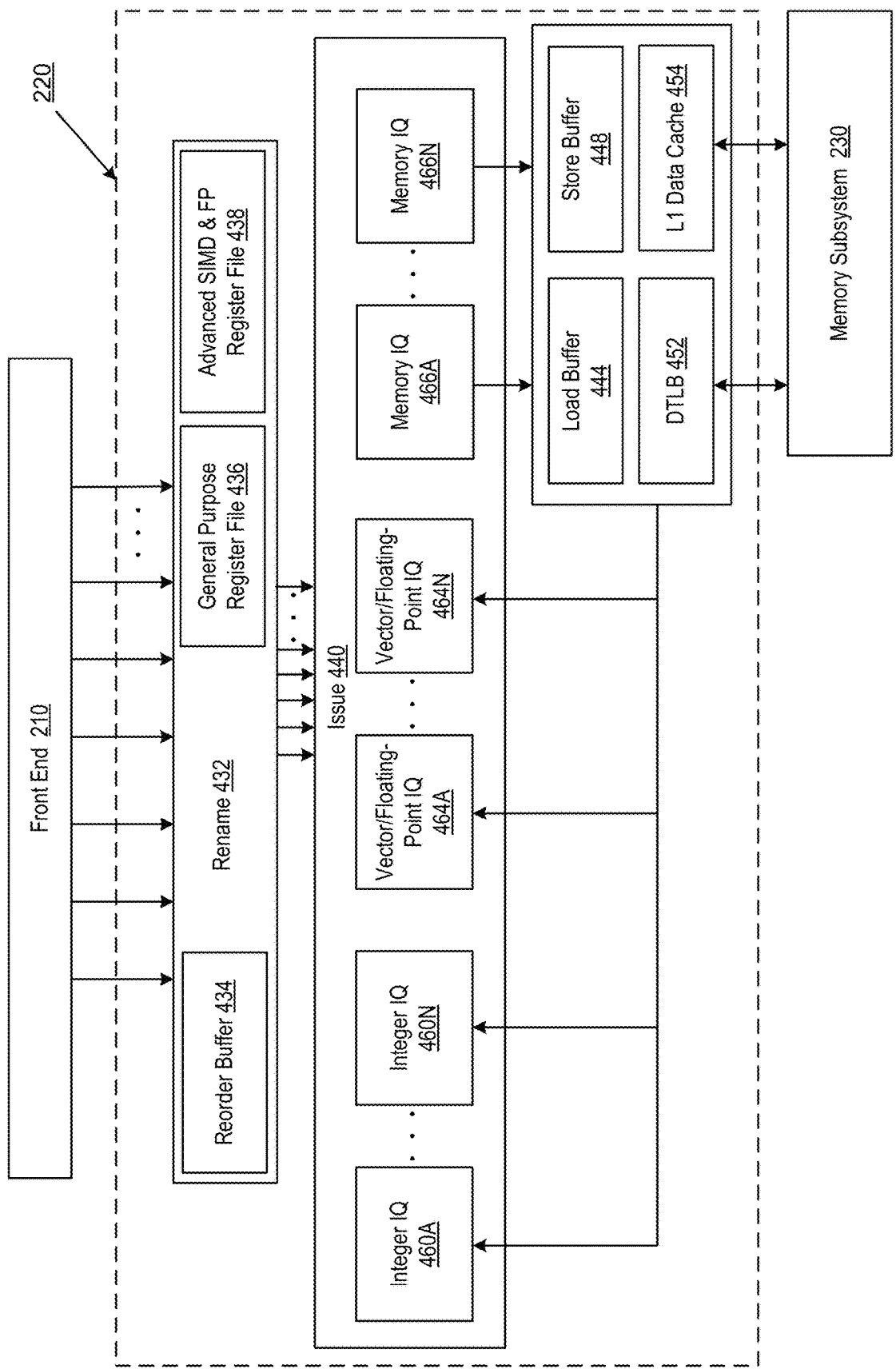
FIG. 4 illustrates a block diagram of a midcore of a processor, in accordance with aspects and embodiments of the present disclosure.

FIG. 4 illustrates a block diagram of a midcore 220 of a processor, in accordance with aspects and embodiments of the present disclosure. The midcore 220 can implement rename, issue, execute, and retire stages of a pipelined processor (e.g., IC 100, processor 200). FIG. 4 illustrates a distributed (e.g., multiple issue queues) issue queue topology, however, aspects and implementations of the present disclosure may apply a unified issue queue topology, as described in detail below.

At a rename 432 stage, Instructions can be received from a front-end (e.g., front-end 210) of the processor. During rename 432, the processor assigns physical registers to architectural registers. Architectural registers are registers that are specified in the instruction set architecture (ISA). At the rename 432 stage, portions of the processor states can be renamed, with the physical copies residing in a register file. Registers, flags, predicates, and the like may be renamed at the rename 432 stages. In an illustrative example, the rename 432 stage includes a general-purpose register (GPR) file 436 and an advanced single instruction, multiple data (SIMD) and floating (FP) register file 438 used to support SIMD and FP operations. In at least one embodiment, the GPR file 436 and advanced SIMD & FP register file 438 can be statically split. For example, when the processor is operating in multi-thread mode, a first thread can rename, allocate to, etc., a first portion (e.g., half) of the physical registers of the GPR file 436 and the advanced SIMD & FP register file 438 and a second thread can rename, allocate to, etc. a second portion (e.g., the other half) of the physical registers of the GPR file 436 and the advanced SIMD & FP register file 438. Write ports and read ports of the first portion of the physical registers can be dedicated to the first thread, and write ports and read ports of the second portion of the physical registers can be dedicated to the second thread such that conflicts between the first thread and the second thread are avoided. In another example, when the processor 200 is operating in single-thread mode, the active thread can rename, allocate to, etc., each register of the GPR file 436 and the advanced SIMD & FP register file 438.

In at least one embodiment, the processor can include a speculative rename table (SRT) (not illustrated) to hold speculative mappings from logical register (e.g., ISA registers) to physical registers. In at least one embodiment, the SRT state can be replicated while operating in multi-thread mode, and associated read/write ports can be replicated or statically partitioned per thread. It is appreciated that any structure that references architectural register may replicate a full set of the reference architectural register for each thread while operating in multi-thread mode, and associated read/write ports can be replicated or statically partitioned.

In at least one embodiment, the processor can include a free list (not illustrated) to manage the general-purpose register file 436 and/or the advanced SIMD & FP register file 438. During the rename 432 stage of the processor, the free list can be used to track available physical registers of the general-purpose register file 436 and/or the advanced SIMD & FP register file. When an instruction requests a register, the processor can check the free list to determine whether there is an unused physical register that the instruction can use. In at least one embodiment, the free list can be statically partitioned per-thread.

The rename 432 stage of the processor includes a reorder buffer (ROB) 434. After instructions are renamed, they can be dispatched to the ROB 434 and issue 440 stage. The ROB 434 can track inflight instructions and decouple instruction execution from instruction retirement, thereby increasing utilization of execution units. Additionally, the ROB 434 can handle exceptions and interrupts. For example, when an exception is thrown, the ROB 434 can roll back uncommitted instructions and restore an architectural state of the processor 200. Additionally, the ROB 434 can ensure that instructions are retired in program order even if the instructions are executed out of order. Accordingly, the ROB 434 can cause the architectural state of the processor 200 to appear as if the instructions were executed according to the program order by allowing it to execute out of order and commit and retire in order. As instructions pass through rename to dispatch, they can be split into smaller units of work that is tracked by the ROB 434. For example, a single store instruction can be split into a store address operation and store data operation. In at least one embodiment, the ROB 434 can be statically partitioned on a per-thread basis. For example, the ROB 434 can be statically partitioned using wrap points, as described above.

In at least one embodiment, the processor 200 can include one or more checkpoints and checkpoint logic to recover from branch mispredictions, exceptions, interrupts, and other discontinuities associated with out-of-order program execution. The checkpoints can periodically (e.g., dynamically, every fixed number of clock cycles, etc.) capture an architectural state (e.g., registers, program counters, etc.) of the processor 200. When a branch misprediction, exception, interrupt, etc. occurs, the processor 200 can restore the architectural state of the processor 200 to a saved state according to the one or more checkpoints and restart execution from the checkpoint or restart execution from an instruction younger than the checkpoint by walking forward from the checkpoint through a log of renames in the ROB 434 or a side structure and recovering the architectural state of the younger point. In at least one embodiment, checkpoints can be partitioned and/or unified according to one or more of the implementations discussed above.

Dispatch

After the rename 432 stage, instructions can be dispatched to issues queues to be issued and subsequently executed. In at least one embodiment, the dispatch stage of the processor can be statically partitioned, in a similar manner as described above with respect to the decode stage. Because partitioned pipelines operate independently, cross-thread stalls can be avoided, and security issues can be prevented, as described above. Additionally, the dispatch stage may be unified while operating in single-thread mode.

Issue and Execution

The processor 200 includes an issue 440 stage to select and issue instructions to suitable execution units for execution. The processor 200 includes issue queues (IQs) to receive instructions that have been fetched, decoded, and dispatched. The IQs can temporarily store instructions that cannot be immediately executed due to data dependencies or resource unavailability. The primary role of the issue queues is to determine which instructions are ready for execution in the next clock cycle. Aspects and implementations of the present disclosure may apply to variety of topologies. For example, IQs described herein can be distributed (one IQ per execution unit), centralized (one or more for all execution units), a hybrid approach of the two (e.g., one issue queue services multiple but not all execution units), or any combination of the above approaches. Accordingly, each IQ can serve one or more execution units. For example, the processor 200 can include one or more integer IQs 460A-460N that can each serve one or more single-cycle or multi-cycle instruction execution pipes, such as multiply, divide, addition, subtraction, division, logical (AND, OR, XOR, etc.), bit shifting, and branch operations, all of which can read or write to general purpose/integer registers. In at least one embodiment, the processor 200 includes vector/floating-point IQs 464A-464N that can serve vector execution units (for executing vector instructions and/or floating point (FP) instructions). The processor 200 can include one or more memory IQs 466A-466N. Each memory IQ 466 can serve one or more load execution units and/or one or more load-store execution units.

In at least one embodiment, one or more of the above-described IQs can be vertically partitioned such that every entry of a given issue queue can serve one thread. In an illustrative example, the processor 200 can include two or more integer IQs 460, two or more vector/floating point IQs 464, and two or more memory IQs 466. When the processor 200 is operating in multi-core mode with two threads active, the integer IQs 460 can be vertically partitioned such that each integer IQ 460 exclusively serves a particular thread. In an illustrative example, the processor 200 can include integer IQs 460A, 460B, 460C, and 460N. Each entry of the integer IQs 460A and 460B can serve a first thread of the processor 200 and each entry of the integer IQs 460C and 460N can serve a second thread of the processor 200. When the processor 200 is operating in single-core mode with one thread active, every entry of the integer IQs 460A-460N can serve the active thread. In at least one embodiment, the vector/floating point IQs 464 and the memory IQs 466 can also be vertically partitioned on a per-thread basis.

In at least one embodiment, one or more of the above-described IQs can be horizontally partitioned such that a given issue queue can serve multiple threads. In an illustrative example, the processor 200 can include Integer IQs 460A, 460B, 460C, 460D, and 460N. When the processor 200 is operating in multi-core mode with two threads active, each of the integer IQs 460A-460N can be horizontally partitioned such that a first portion (e.g., a first half) of the entries of each of the integer IQs 460A-460N serve a first thread and a second portion (e.g., a second half) of the entries of each of the integer IQs 460A-460N serve a second thread. In at least one embodiment, more than one picker can each serve an execution unit associated with each of the integer IQs 460 and are dedicated per thread. A picker is a hardware component responsible for selecting instructions from a corresponding issue queue for dispatch to a correct execution unit. For example, a first picker dedicated to the first thread can serve a first execution unit associated with integer IQs 460A. A second picker dedicated to the second thread can serve a second execution unit associated with integer IQs 460A. The integer IQs 460B, 460C, 460D, and 460N can be horizontally partitioned in a similar manner. In at least one embodiment, when the processor 200 is operating in single-core mode with one thread active, each of the integer IQs 460A-460N, corresponding pickers, and execution units can be dedicated to the active thread.

In at least one embodiment, pickers corresponding to an issue queue that serve multiple threads can be modulated according to a pre-defined (e.g., not influenced by the dynamic nature of the instruction being executed) pattern. In an illustrative example, the first picker and the second picker can retrieve instructions from the integer IQs 460A, as described above. The first picker can be dedicated to the first thread and serve the first execution unit, while the second picker can be dedicated to the second thread and serve the second execution unit. Alternatively, to preserve thread isolation and avoid security issues associated with the first thread and the second thread sharing resources, the first picker and second picker retrieving instructions from the integer IQs 460A can be modulated according to a pre-defined pattern. For example, the first picker can retrieve instructions from the integer IQs 460A for the first thread on odd clock cycles, and the second picker can retrieve instructions from the integer IQs 460A for the second thread on even clock cycles. Accordingly, resources can be time-multiplexed such that dynamic instructions do not cause variance in behavior.

In at least one embodiment, one or more hardware structures and corresponding data paths (e.g., issue queues and corresponding execution units of a single type) can be dynamically reconfigured to be dedicated to a single thread while the processor is operating in multi-core mode. For example, a first workload may be executing instructions requiring vector execution resources (e.g., floating point (FP) instructions) on a first thread of the processor 200, while a second workload may be executing other instructions that do not require vector execution resources on a second thread of the processor 200. Accordingly, the processor 200 can be reconfigured such that each vector/floating point IQ 464, picker, and corresponding vector execution unit (for FP computation and vector integer computation) is dedicated to the first thread to extract increased vector execution performance on behalf of the first workload. The dynamic reconfiguration may be triggered by a timer, detection logic, a specific instruction, a user input, or other similar mechanisms. In at least one embodiment, the hardware may determine to dynamically reconfigure the one or more hardware structures back to more than one thread, when it is no longer beneficial to have them dedicated to a single thread. For example, this dynamic reconfiguration back to more than one thread may be determined by logic detecting the other thread will use the relevant structure or data path, a specific instruction, user input, or a timer.

As described above, pickers can retrieve instructions from a corresponding issue queue for execution at a corresponding execution unit. Execution units of the processor perform operations specified by the instruction. In at least one embodiment, the execution units can be statically split per thread. In an illustrative example, the branch execution units can be statically split per thread. When the processor is operating in multi-thread mode, a first set of branch execution units can correspond to a first thread, and a second set of branch execution units can correspond to a second thread. The first set of branch execution units can interface with branch predictors associated with the first thread, and the second set of branch execution units can interface with branch predictors associated with the second thread. For example, in the case of a branch misprediction associated with the first thread, a branch execution unit from the first set of branch execution units can perform corrective action (e.g., flush the pipeline corresponding to the first thread, discard speculatively executed instructions beyond the misprediction, fetch the correct branch target, send updates to a BPU corresponding to the first thread, etc.) without affecting the pipeline corresponding to the second thread. Accordingly, branch predictors can receive two mispredictions (a first misprediction associated with the first thread and a second misprediction associated with the second thread) in a same clock cycle and handle the simultaneous mispredictions in parallel. The first set of branch execution units corresponding to the first thread and the second set of branch execution units corresponding to the second thread is used herein by way of example, and not by way of limitation. Aspects and implementations of the present disclosure can generally be applied to a multi-core processor (and associated sets of branch execution units) with more than two cores that can be reconfigured into a unified core processor. In at least one embodiment, the execution units can be unified such that each execution unit of the processor serves the only active thread.

To execute operations specified by issued instructions, data can be retrieved from multiple sources (e.g., a general-purpose register file 436; an advanced SIMD & FP register file 438; caches, such as an L1 data cache 454; a bypass network; etc.). It is appreciated that execution units and sources of data can be statically partitioned on a per-thread basis when the processor is executing in multi-thread mode. For example, a first set of execution units can serve a first thread, and its corresponding first bypass network can also be dedicated to the first thread. A second set of execution units can serve a second thread, and its corresponding second bypass network can also be dedicated to the second thread. Accordingly, because execution units and corresponding bypass networks are statically partitioned per thread, a given execution unit can avoid latency associated with crossing to the other bypass network to retrieve data. Additionally, partitioned execution units can be unified to serve the only active thread when operating in single-thread mode.

In at least one embodiment, IQ pairs and corresponding execution units can be symmetrical. An IQ pair can refer to two IQ units in which, when the processor 200 is operating in a dual-core configuration (two separate cores), a first IQ of the IQ pair is dedicated to a first core and a second IQ of the IQ pair is dedicated to a second core. The IQ pair can be symmetrical in that the first IQ and the second IQ have the same number and type of execution units and pickers. In an illustrative example, an integer IQ 460A and an integer IQ 460B can both include two ALUs and one branch execution unit. This can ensure that the first core and the second core can both utilize an equal amount of instruction execution resources. In at least one embodiment, an IQ pair can be asymmetrical. In at least one embodiment, an IQ pair can extend to an IQ set, for example, when N>2 in an N-core embodiment.

Load-Store

The processor includes a store buffer 448 to decouple execution of store instructions from commitment to memory. The store buffer 448 can hold store operations after they have been executed to ensure in-order retirement of store operations. The processor can temporarily record store operations in the store buffer 448 to avoid unnecessary stalling. In some embodiments, the store buffer 448 can be statically split. For example, when the processor 200 is operating in multi-thread mode, the store buffer 448 can be statically split such that a first thread of the processor 200 can record corresponding store operations in a first portion of the store buffer 448, and a second thread can store corresponding store operations in a second portion of the store buffer 448. When the processor 200 is operating in single-thread mode, the store buffer 448 can be unified such that the active thread can record corresponding store operations using the entirety of the store buffer 448.

In at least one embodiment, the processor can include one or more memory IQs 466, as described above. In an illustrative example, a load instruction can be received and held within load memory IQ 466A. When conditions are met (e.g., dependencies resolved, execution units available, instruction has priority, etc.), the load instruction can be sent for execution. A load instruction can be used to retrieve data from memory (e.g., L1 data cache 454) and store the data within a register file of the processor. In at least one embodiment, the processor can determine additional information about the load instruction such as instruction source, load type (signed halfword, unsigned halfword, signed word, unsigned word, byte, doubleword, etc.), a load size (number of bits or bytes to be retrieved from memory), and the like. In at least one embodiment, the processor can include an address generation unit (AGU) (not illustrated) to generate virtual memory addresses for accessing data in a memory cache (e.g., the L1 data cache 454) or another memory (e.g., memory subsystem 230) according to the sent load instruction.

In response to the virtual memory address corresponding to the sent load instruction being generated by the address generation unit, a data translation lookaside buffer 452 (DTLB 452) can be queried to determine whether a physical address corresponding to the virtual memory address generated by the address generation unit is stored within the DTLB 452. The DTLB 452 can include multiple entries that each contain a virtual address and a corresponding physical address translation. When a data access occurs (e.g., due to a load instruction), the processor first queries the DTLB 452 to determine whether the address translation is readily available. In response to determining that the translation is located in the DTLB 452 (a DTLB hit), the physical address can be retrieved from the DTLB 452, and the load instruction can proceed. In response to determining that the translation is not located in the DTLB 452 (a DTLB miss), a page table walk is initiated to locate the corresponding address translation in page tables (not illustrated) and update the DTLB 452 with the corresponding address translation. In at least one embodiment, the DTLB 452 can be partitioned per-thread according to one or more of the above-described partitioning methodologies.

The processor includes an L1 data cache 454. The L1 data cache 454 can store recently accessed data. A memory address generated from a load instruction can be checked within the L1 data cache 454 to determine whether the requested data is stored in the L1 data cache 454. If the data is stored in the L1 data cache 454, it results in a cache hit, and the data can be retrieved from the data cache 454. If the data is not stored in the L1 data cache 454, it results in a cache miss, and the data can be retrieved from a higher-level memory, such as a memory within the memory subsystem. In some embodiments, the L1 data cache 454 can be partitioned per-thread. In at least one embodiment, a partitioned L1 data cache 454 can arbitrate access to the memory subsystem on a per-thread basis.

Store Address (STA) instructions can follow a similar path as load instructions. For example, an AGU can generate virtual memory addresses for accessing data in a memory cache, the DTLB 452 can be queried to determine whether a physical address corresponding to the virtual memory address generated by the AGU is stored within the DTLB 452, and arbitration for entry into the load-store pipeline can be performed. After arbitration into the load-store pipeline, an entry can be allocated in the store buffer 448 to track addresses of store instructions currently being processed by the load-store pipeline. In at least one embodiment, the processor can determine which entry of the store buffer 448 to write to based on the thread ID of the store instruction, where the entries are partitioned per thread. In at least one embodiment, responsive to the memory address of the store instruction being written to the store buffer 448, the store instruction can be resolved. In response to the store instruction being resolved, a notification can be transmitted to the ROB 434 to remove the STA instruction from the ROB 434.

Store Data (STD) instructions can cause store data to be computed from the store instruction and stored in the store buffer 448. The store buffer 448 can hold data until a suitable time to write the data to a memory (e.g., memory subsystem). The STD instruction can be written to the store buffer 448 before or after the corresponding STA instruction is written to the store buffer 448 with the same SID as the corresponding STA instruction. When, for a given store buffer 448 entry, data associated with a corresponding STD instruction is received, the given store buffer 448 can be deallocated from the store buffer 448. Additionally, the corresponding data stored in the store buffer 448 can be transferred to a write combining buffers (WCB) that can combine writes to a line of data before committing and writing to memory. In at least one embodiment, pipelines and hardware structures associated with store operations can be statically split on a per-thread basis according to one or more of the above-described methodologies.

In at least one embodiment, the load-store pipeline can include a DCache miss trackers (DCMT) (not illustrated) along a miss path of the load-store pipeline. The DCMT is a hardware structure that tracks outstanding L2 memory (e.g., within the memory subsystem) read requests that have missed L1. In at least one embodiment, the DCMT can be statically split on a per-thread basis according to one or more of the above-described methodologies.

The midcore 220 includes a load buffer 444 within the load-store pipeline. The purpose of the load buffer 444 is to detect memory-ordering violations and ensure consistency. In at least one embodiment, the load buffer 444 can prevent read-after-read (RAR) data conflicts/dependencies with logic referred to as a finished load buffer (FLB). For example, a RAR data dependency can occur when a first load instruction causes data to be read from a memory location (e.g., a register), and a subsequent load instruction causes the same data to be read from the same memory location (e.g., the same register). Such a situation can cause a data hazard, for example, if the subsequent load instruction causes the data to be read before it is available or if the data has been modified. To prevent RAR data hazards, the load buffer 444 has FLB logic that can track pending load instructions that do not yet have computed addresses. For example, a first load instruction may not yet have a computed address. Subsequent load instructions can be stored within the load buffer 444 pending computation of the first load address. When the first load address is computed, the first load address is compared against addresses of the subsequent load instructions stored in the load buffer 444. Load instructions stored in the load buffer 444 with computed addresses matching the first load address can be discarded to prevent RAR data dependency hazards.

In at least one embodiment, the load buffer 444 can prevent read-after-write (RAW) data hazard with FLB logic. For example, a RAW hazard violation can occur when a store instruction causes data to be written to a memory location (e.g., a register), and a subsequent load instruction causes data to be read from the same memory location (e.g., the same register). Such a situation can cause a data hazard violation if the subsequent load operation reads data to be stored by the write operation. For example, a RAW data hazard violation can occur if the subsequent load instruction reads from the memory location before the write instruction writes the data to the memory location. To prevent RAW data hazard violations, the load buffer 444 has FLB logic that can track completed load instructions that are younger than one or more store instructions with addresses that have yet to be computed. For example, a first stored instruction may not yet have a computed address. Subsequent load instructions can be stored within the load buffer 444 pending computation of the store address. When the store address is computed, the store address is compared against addresses of the subsequent load instructions stored within the load buffer 444. Load instructions stored in the load buffer 444 with computed addresses matching the address of the store instruction can be discarded to prevent read-after-write data dependency hazards. In at least one embodiment, the load buffer 444 and associated structures (such as memory disambiguation buffers, FLB, and the like) can be statically split on a per-thread basis according to one or more of the above-describe methodologies.

In at least one embodiment, the processor can include one or more prefetchers (not illustrated). Prefetchers are structures to generate predictions of data requests and retrieve data from the memory subsystem ahead of it being requested by the processor. The one or more prefetchers can speculatively issue requests to the memory subsystem according to the predictions. The prefetchers can leverage principles of spatial locality (e.g., a tendency of nearby data to be accessed together or in patterns), temporal locality (e.g., the anticipation of future iterations of a loop), and the like to generate predictions. In at least one embodiment, the one or more prefetchers can be statically split per core according to one or more of the above-described methodologies.

Retire

In at least one embodiment, the processor can include a retire (also referred to as "commit" herein) stage (not illustrated) to update an architectural state of the processor to reflect the effects of executed instructions. As described above, instructions can be allocated in the reorder buffer (ROB) 434 in program order and executed out-of-order. In at least one embodiment, groups of instructions can be retired in program order. For example, resources associated with the oldest group of instructions can be released for the processor to use and progress younger instructions. In at least one embodiment, an engine can identify the oldest entries in the ROB 434 to retire. Accordingly, the ROB 434 can cause the architectural state of the processor to appear as if the instructions were executed according to the program order by allowing instructions to execute out of order and commit/retire in order. In at least one embodiment, the ROB 434 can be statically partitioned per core according to one or more of the above-described methodologies.

In at least one embodiment, instructions can be retired in a time multiplexed manner by alternating retirement of instructions on a per-thread basis. For example, when the processor is operating on multi-thread mode, N instructions associated with a first thread can be retired on a first clock cycle, and N instructions associated with a second thread can be retired on a second clock cycle. Instructions can continue to be retired in such an alternating manner.

In at least one embodiment, the processor can include one or more checkpoints and checkpoint logic to recover from branch mispredictions, exceptions, interrupts, and other discontinuities associated with out-of-order program execution, as described above. The checkpoints can periodically (e.g., dynamically, every fixed number of clock cycles, etc.) capture an architectural state (e.g., registers, program counters, etc.) of the processor. When a branch misprediction, exception, interrupt, etc. occurs, the processor can restore the architectural state to a saved state according to the one or more checkpoints and restart execution from the checkpoint. In at least one embodiment, checkpoints can be statically partitioned per thread. For example, when the processor is operating in multi-thread mode, a first core and a second core can independently have branch mispredictions and simultaneously flush and restore to a respective checkpoint. Statically partitioning on a per thread basis can help prevent either thread from taking all resources, starving the other thread, and generally avoid unfair (e.g., unequal) resource assignment.

Memory Subsystem

Figure 5:
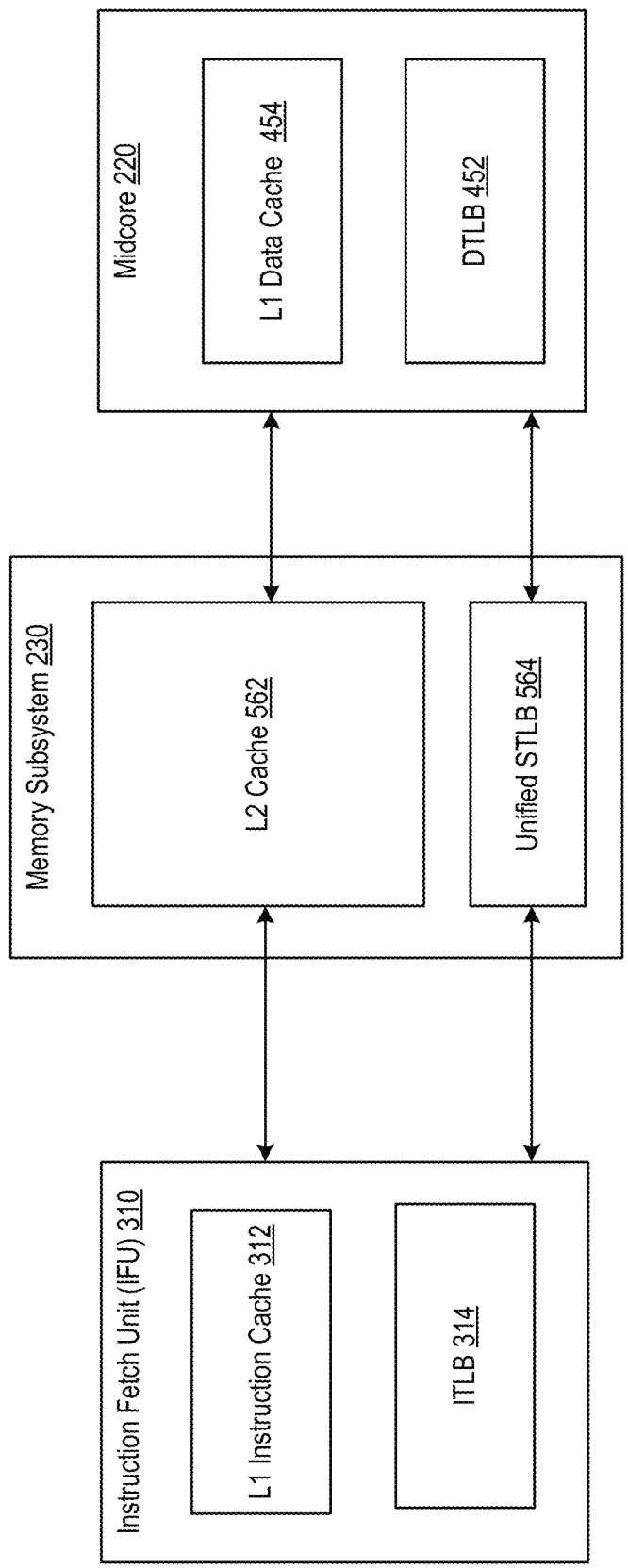
FIG. 5 illustrates a block diagram of a memory subsystem of a processor, in accordance with aspects and embodiments of the present disclosure.

FIG. 5 illustrates a block diagram of a memory subsystem 230 of a processor, in accordance with aspects and embodiments of the present disclosure. The memory subsystem is operatively coupled to the instruction fetch unit 310 (IFU 310) of the front-end 210 and the midcore 220. The IFU 310 includes an L1 instruction cache 312 and an instruction translation lookaside buffer 314 (ITLB 314), as described above with respect to FIG. 3. The midcore 220 includes an L1 data cache 454 and a data translation lookaside buffer 452 (DTLB 452), as described above with respect to FIG. 4.

In at least one embodiment, the memory subsystem 230 includes an L2 cache 562 and a unified L2 second-level translation lookaside buffer 564 (unified STLB 564). The unified STLB 564 can be shared across both data address translations (e.g., DTLB 452) and instruction address translations (e.g., ITLB 314). If the processor does not find an entry ("misses") in either the DTLB 452 or the ITLB 314, the processor can initiate a request to the unified STLB 564 to determine whether the requested translation is present in the unified STLB 564. If an entry is not found in the unified STLB 564, a page walk can be performed to populate the entry. In at least one embodiment, a page walk unit can handle the page walk and can be statically partitioned and/or combined according to one or more the above-described methodologies. The L2 cache 562 can be shared across data (e.g., L1 data cache 454) and instructions (e.g., L1 instruction cache 312). If the processor does miss in either the data cache 454 or the L1 instruction cache 312, the processor can initiate a request to L2 cache 562 to determine whether the requested data or instruction is present in the L2 cache 562. If an entry is not found in the L2 cache 562, a cache line request can be sent to a system outside of the memory subsystem 230.

In at least one embodiment, port access to a dedicated interface (e.g., a bus) between memory subsystem 230 and the IFU 310, and between the memory subsystem 230 and the midcore 220 can arbitrate (e.g., round-robin arbitration, etc.) between cores while the processor is operating with multiple cores. The L1 instruction cache 312, the ITLB 314, and DTLB 452, and the L1 data cache 454 can arbitrate for port access to respective interfaces to the memory subsystem 230. In at least one embodiment, the processor can include multiple interfaces dedicated to a respective core. It is appreciated that arbitration for accessing the memory subsystem 230 can include other known methods of arbitration, such as priority-based arbitration (e.g., the priority assigned to a thread based on thread importance, thread type, a requirement of the application, etc.) or other pre-defined arbitration policy.

Reconfiguration

FIG. 6 illustrates a flow diagram of an example method 600 of dynamic reconfiguration of a processor from multiple cores to a unified core, in accordance with aspects and embodiments of the present disclosure. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 602 of method 600, a first thread executes in a first pipeline of a first core of an integrated circuit (IC). The first core includes a first set of hardware structures. In at least one embodiment, the first set of hardware structures can include hardware structures described above with respect to FIG. 2, FIG. 3, FIG. 4, and FIG. 5. For example, the first set of hardware structures can include one or more buffers (e.g., branch target buffers of FIG. 3, instruction translation lookaside buffer 314 (ITLB 314), reorder buffer 434 (ROB 434), store buffer 448 (SB 448), data translation lookaside buffer 452 (DTLB 452), etc.); caches (e.g., L1 instruction cache 312, L1 data cache 454, L2 cache 562, etc.); branch predictors; queues associated with various stages of the first pipeline (e.g., decode queue 318); register files (e.g., general-purpose register file 436, advanced SIMD & FP register file 438, etc.); execution units (e.g., arithmetic logic units (ALUs), load/store units, vector processing (VX) units, branch execution units, etc.); and the like.

At operation 604, a second thread executes in a second pipeline of a second core of the IC. The second core includes a second set of hardware structures. In at least one embodiment, the second set of hardware structures can include hardware structures described above with respect to FIG. 2, FIG. 3, FIG. 4, and FIG. 5, which are separate from the first set of hardware structures. For example, the first set of hardware structures can include one or more buffers (e.g., branch target buffers of FIG. 3, ITLB 314, ROB 434, SB 448, DTLB 452, etc.); caches (e.g., L1 instruction cache 312, L1 data cache 454, L2 cache 562, etc.); branch predictors; queues (e.g., decode queue 318); register files (e.g., general-purpose register file 436, advanced SIMD & FP register file 438, etc.); execution units (e.g., arithmetic logic units (ALUs), load/store units, vector processing (VX) units, branch execution units, etc.); and the like.

In at least one embodiment, a subset of the first set of hardware structures and the second set of hardware structures can share read access to a subset of hardware structures that are statically partitioned between the first core and the second core. For example, one or more caches (e.g., L1 instruction cache 312, L1 data cache 454, L2 cache 562, etc.) disposed on the IC can be set associative caches that are statically partitioned into a subset of cache lines or ways of the cache where each partition services a respective core of the IC, as described above. In another example, statically partitioning a subset hardware structures between the first core and the second core can be managed by pointers and wrap points or wrapping pointers, as described above.

At operation 606, in response to a command to operate the IC with a unified core, operations 608 and 610 are performed. In at least one embodiment, the command to operate the IC with the unified core is issued in response to a determination that the second thread has been in an inactive state for more than a threshold number of clock cycles. In at least one embodiment, the threshold number of clock cycles can be defined by a designer of the processor. For example, a designer can define the threshold number of clock cycles as 50 clock cycles before a switch between modes of the processor. In at least one embodiment, the threshold number of clock cycles can be a configurable parameter. For example, the threshold number of clock cycles can be configured by system software in silicon to define a parameter of a hardware component that dictates the threshold number of clock cycles. In at least one embodiment, the threshold number of clock cycles can be configured via Basic Input/Output System (BIOS) settings, Unified Extensible Firmware Interface (UEFI) settings, device drivers, and the like. An inactive state indicates that the core is not currently executing instructions or performing computational tasks. In at least one embodiment, the second core can enter the inactive state in response to receiving an instruction that indicates the second thread is transitioning to the inactive state, such as a wait-for-interrupt (WFI) instruction or a halt instruction, from system software (e.g., an operating system (OS), virtual machine, hypervisor, firmware, etc.) of the IC. The instruction directs a core (e.g., the second core) to halt execution until the core receives an interrupt signal from the system software. When an interrupt signal is received from a hardware component, such as an interrupt controller, the core can resume execution of instruction (also referred to as "wake up" herein).

In at least one embodiment, the command can be received from system software of the processor. In at least one embodiment, the command can be received from firmware such as a Basic Input/Output System (BIOS). In at least one embodiment, the command can be received from an application or other software source. In at least one embodiment, a hardware component can detect a condition that causes the processor to be reconfigured to a unified core. For example, the hardware component can detect that the second core has been in an inactive state for more than threshold number of clock cycles and, as a result, cause the processor to be reconfigured to a unified core, as described above.

In at least one embodiment, the command to operate the IC with the unified core is issued in response to a determination that the first core has reached an interruptible point. In at least one embodiment, an interruptible point may indicate that the first core is in a state that allows reconfiguration of pipelines and structures. An interruptible point is a specific point within execution of a sequence of instructions that the first core can be interrupted while preserving a program state of the first core.

In some embodiments, prior to unification of the first core and second core, the first pipeline and/or the second pipeline can be flushed. For example, to flush the first pipeline, instructions currently present within the first pipeline can be flushed. To flush instructions currently present within the first pipeline, instructions throughout various stages of the first pipeline can be removed or invalidated to prevent execution of instructions that have been fetched and only partially executed. In at least one embodiment, the flush can be initiated by a retirement unit to ensure instructions that have not yet been committed or retired are flushed from the first pipeline. In at least one embodiment, a subset of the first set of data structures can be flushed. For example, out-of-order execution structures, such as the reorder buffer 434, can be flushed to discard any instructions from the first pipeline that were flushed. In at least one embodiment, BTBs and registers files (e.g., general-purpose register file 436, advanced SIMD & FP register file 438) can be flushed. In at least one embodiment, data stored in another subset of the first set of data structures can be retained (e.g., not flushed). For example, the processor can refrain from flushing caches (e.g., L1 instruction cache 312, L1 data cache 454, L2 cache 562, etc.) and translation lookaside buffers (e.g., ITLB 314, DTLB 452, unified STLB 564, etc.). In at least one embodiment, register files and the rename state, microarchitectural state, and/or architectural state can be saved prior to the flush to ensure the state can be restored before resuming execution of the first thread.

At operation 608, the first core is unified with the second core to obtain a unified core. The first pipeline is unified with the second pipeline to obtain a unified pipeline, and the first set of hardware structures is unified with the second set of hardware structures to obtain a unified set of hardware structures. In at least one embodiment, to unify the first set of hardware structures with the second set of hardware structures, the IC can be reconfigured to allow the unified core to allocate entries to the first set of hardware structures and the second set of hardware structures. The first and the second set of hardware structures can be unified according to one or more of the above-described methodologies.

In at least one embodiment, stages of the first pipeline and the second pipeline can be unified to obtain a unified pipeline within which the unified core can operate. Accordingly, the unified pipeline can execute the active thread at an increased bandwidth compared to the first pipeline executing a first thread and the second pipeline executing a second thread. For example, prior to transition to the unified core, the IC can operate the first pipeline in the first core of the IC at a maximum bandwidth of N instructions per clock cycle in parallel (referred to as N-wide) and can operate an N-wide second pipeline in the second core of the IC. The pipeline stages (e.g., fetch, decode, rename, etc.) of the first core and second core can be unified such that the IC can operate the unified pipeline in the unified core at a full width of the IC. For example, the N-wide pipeline of the first core and the second core can be unified into a unified pipeline such that the IC can operate a 2N-wide unified pipeline in the unified core.

In at least one embodiment, the method further includes saving an architectural state, a micro architectural state and/or a rename state (referred to generally as "state" herein) of the first core and the second core to a side structure of the IC and restoring the state of the first core to the unified core in response to unifying the first core and the second core. In an illustrative example, a rename state of first and second core can be saved and restored. The rename state or renamed architectural state can refer to values stored in physical registers (e.g., e.g., general-purpose register file 436, advanced SIMD & FP register file 438, control registers, special-purpose registers, etc.) assigned to a particular core. Physical registers assigned to store the rename state of an inactive thread of the second core can be released to allow the active thread (e.g., the thread to operate on the unified core) to access the physical register previously utilized by the inactive thread of the second core. To allow full utilization of the physical registers of the IC, values (referred to herein as the "rename state") associated with the physical registers assigned to the inactive thread of the idle second core can be saved to a side structure (e.g., a special-purpose storage element, or special-purpose registers to store the rename state) and restored if the inactive thread wakes up at a later point. In at least one embodiment, the special-purpose registers to store the saved rename state can be accessed over a special register access bus.

In response to unifying the first core and the second core, the rename state of the first core can be restored to the unified core to execute the active thread on the unified core. It is appreciated that the saving and restoring of rename states can be implemented by processing logic that can include hardware (e.g., a state machine), software (e.g., instructions executing on the IC), firmware, or a combination thereof.

At operation 610, a single thread, such as the first thread, is executed in the unified pipeline of the unified core using the unified set of hardware structures.

Figure 7:
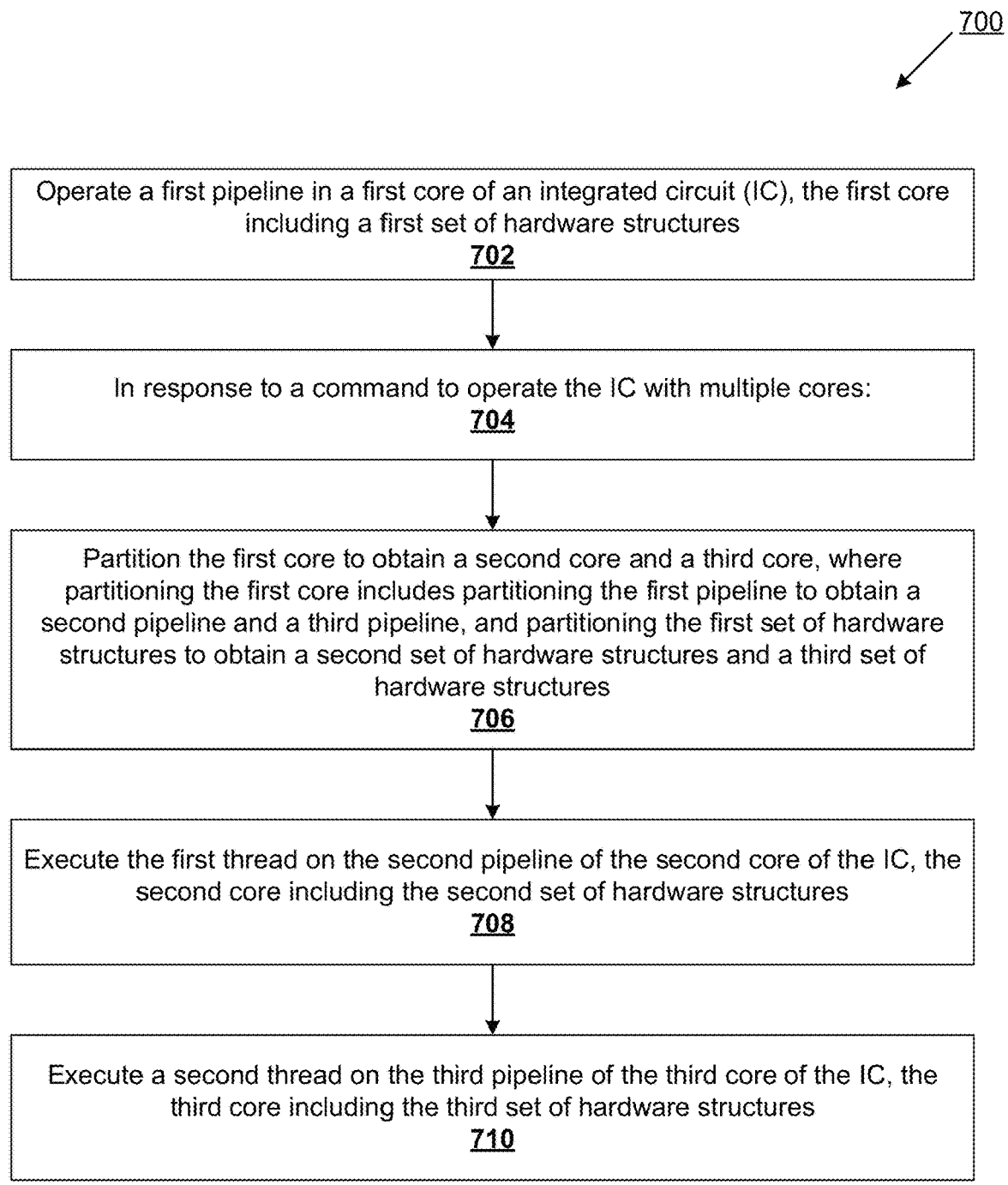
FIG. 7 illustrates a flow diagram of an example method of dynamic reconfiguration of a processor from a unified core to multiple cores, in accordance with aspects and embodiments of the present disclosure.

FIG. 7 illustrates a flow diagram of an example method 700 of dynamic reconfiguration of a processor from a unified core to multiple cores, in accordance with aspects and embodiments of the present disclosure. Although shown in a particular sequence or order, unless otherwise specified, the order of the operations can be modified. Thus, the illustrated embodiments should be understood only as examples, and the illustrated operations can be performed in a different order, and some operations can be performed in parallel. Additionally, one or more operations can be omitted in various embodiments. Thus, not all operations are required in every embodiment.

At operation 702 of method 700, a first pipeline operates in a first core of an integrated circuit (IC), such as IC 100 of FIG. 1. The first core includes a first set of hardware structures. In at least one embodiment, the first set of hardware structures can include hardware structures described above with respect to FIG. 2, FIG. 3, FIG. 4, and FIG. 5. For example, the first set of hardware structures can include one or more buffers (e.g., branch target buffers of FIG. 3, instruction translation lookaside buffer 314 (ITLB 314), reorder buffer 434 (ROB 434), store buffer 448 (SB 448), data translation lookaside buffer 452 (DTLB 452), etc.); caches (e.g., L1 instruction cache 312, L1 data cache 454, L2 cache 562, etc.); branch predictors; queues associated with various stages of the first pipeline (e.g., decode queue 318); register files (e.g., general-purpose register file 436, advanced SIMD & FP register file 438, etc.); execution units (e.g., arithmetic logic units (ALUs), load/store units, vector processing (VX) units, branch execution units, etc.); and the like.

At operation 704, in response to a command to operate the IC with multiple cores, operations 706, 708, and 710 are performed. In at least one embodiment, the command to operate the IC with multiple cores is issued in response to a determination that the second thread is prepared to execute on the IC. In at least one embodiment, the second thread is prepared to execute on the IC in response to reception of an interrupt from a hardware component (e.g., an interrupt controller) of the IC. For example, the second thread may be in an inactive state due to a prior reception of an instruction such as wait-for-interrupt (WFI) instruction or a halt instruction from the OS. The second thread may subsequently receive an interrupt from the OS, causing the second thread to resume executing instructions (e.g., "wake up") on the IC.

In at least one embodiment, the command to operate the IC with multiple cores is issued in response to a determination that the first core (e.g., the unified core) has reached an interruptible point. An interruptible point is a specific point within execution of the first thread that the first core can be interrupted while preserving a program state of the first core.

In some embodiments, the first pipeline is flushed prior to reconfiguring the IC to operate with multiple cores. To flush the first pipeline, instructions currently present within the first pipeline can be flushed. To flush instructions currently present within the first pipeline, instructions throughout various states of the first pipeline can be removed or invalidated to prevent execution of instructions that have been fetched and only partially executed. In at least one embodiment, the flush can be initiated by a retirement unit to ensure instructions that have not yet been committed or retired are flushed from the first pipeline. In at least one embodiment, a subset of the first set of data structures can be flushed. For example, out-of-order execution structures, such as the reorder buffer 434, can be flushed to discard any instructions from the first pipeline that were flushed. In at least one embodiment, branch target buffers, and registers files (e.g., general-purpose register file 436, advanced SIMD & FP register file 438) can be flushed. In at least one embodiment, data stored in another subset of the first set of data structures can be retained (e.g., not flushed). For example, the processor can refrain from flushing caches (e.g., L1 instruction cache 312, L1 data cache 454, L2 cache 562, etc.) and translation lookaside buffers (e.g., ITLB 314, DTLB 452, unified STLB 564, etc.).

At operation 706, the first core (e.g., the unified core 110C) is partitioned to obtain a second core (e.g., the core 110A) and a third core (e.g., the core 110B). To partition the first core, the first pipeline can be partitioned to obtain a second pipeline and a third pipeline, and the first set of hardware resources can be partitioned to obtain a second set of hardware resources and a third set of hardware resources. In at least one embodiment, to partition the first set of hardware structures with the second set of hardware structures, the IC can be reconfigured to prevent the second core from allocating to the third set of hardware structures and prevent the third core from allocating to the second set of hardware structures. Accordingly, the second core and the third core can have exclusive access to the second set of hardware structures and the third set of hardware structures, respectively. Partitioning of hardware structures and pipelines can be performed according to one or more of the above-described methodologies.

In at least one embodiment, stages of the first pipeline can be partitioned to obtain a second pipeline and a third pipeline, within which the second core and the third core can respectively operate. For example, prior to transition to multi-cores, the IC can operate the first pipeline in the first core (e.g., the unified core) of the IC at a maximum bandwidth of 2N instruction per clock cycle in parallel (e.g., 2N-wide). The pipeline stages (e.g., fetch, decode, rename, etc.) of the unified core can be partitioned such that the IC can operate multiple independent pipelines in parallel. For example, the 2N-wide pipeline stages of the unified core can be partitioned such that the IC can independently execute threads on two separate N-wide pipelines.

In some embodiments, the IC can be partitioned into a multi-core configuration with greater than two cores. For example, stages of the first pipeline can be partitioned to obtain four separate pipelines within which four cores can respectively operate within a quad-core configuration. The pipeline stages of the unified core can be partitioned such that the IC can operate four independent pipelines in parallel. For example, the N-wide pipeline stages of the unified core can be partitioned such that the IC can independently execute threads on four separate N/4-wide pipelines.

In at least one embodiment, the method further includes saving an architectural state, a microarchitectural state, and/or rename state of the first core to a side structure of the IC and restoring the rename state of the first core to the second core in response to partitioning the first core. In some embodiments, the state can be saved before reconfiguration to multiple cores and restored after reconfiguration to multiple cores. For example, values (referred to herein as the "state") associated with the physical registers of the first core can be saved to a side structure (e.g., a special-purpose storage element, or special-purpose registers to store the rename state) and restored to the second core after reconfiguration from a unified core to multiple cores. In some embodiments, an architectural state, a microarchitectural state, and/or a rename state associated with the second thread can be restored to the third core after reconfiguration from the unified core to multiple cores. In at least one embodiment, the architectural state, microarchitectural state, and/or the rename state of the second thread may have been previously saved off to the side structure in response to entering an inactive state. It is appreciated that the saving and restoring of rename states can be implemented by processing logic that can include hardware (e.g., a state machine), software (e.g., instructions executing on the IC), firmware, or a combination thereof.

At operation 708, the first thread is executed on the second pipeline of the second core of the IC, the second core including the second set of hardware structures.

At operation 710, the second thread is executed on the third pipeline of the third core of the IC, the third core including the third set of hardware structures.

Figure 8:
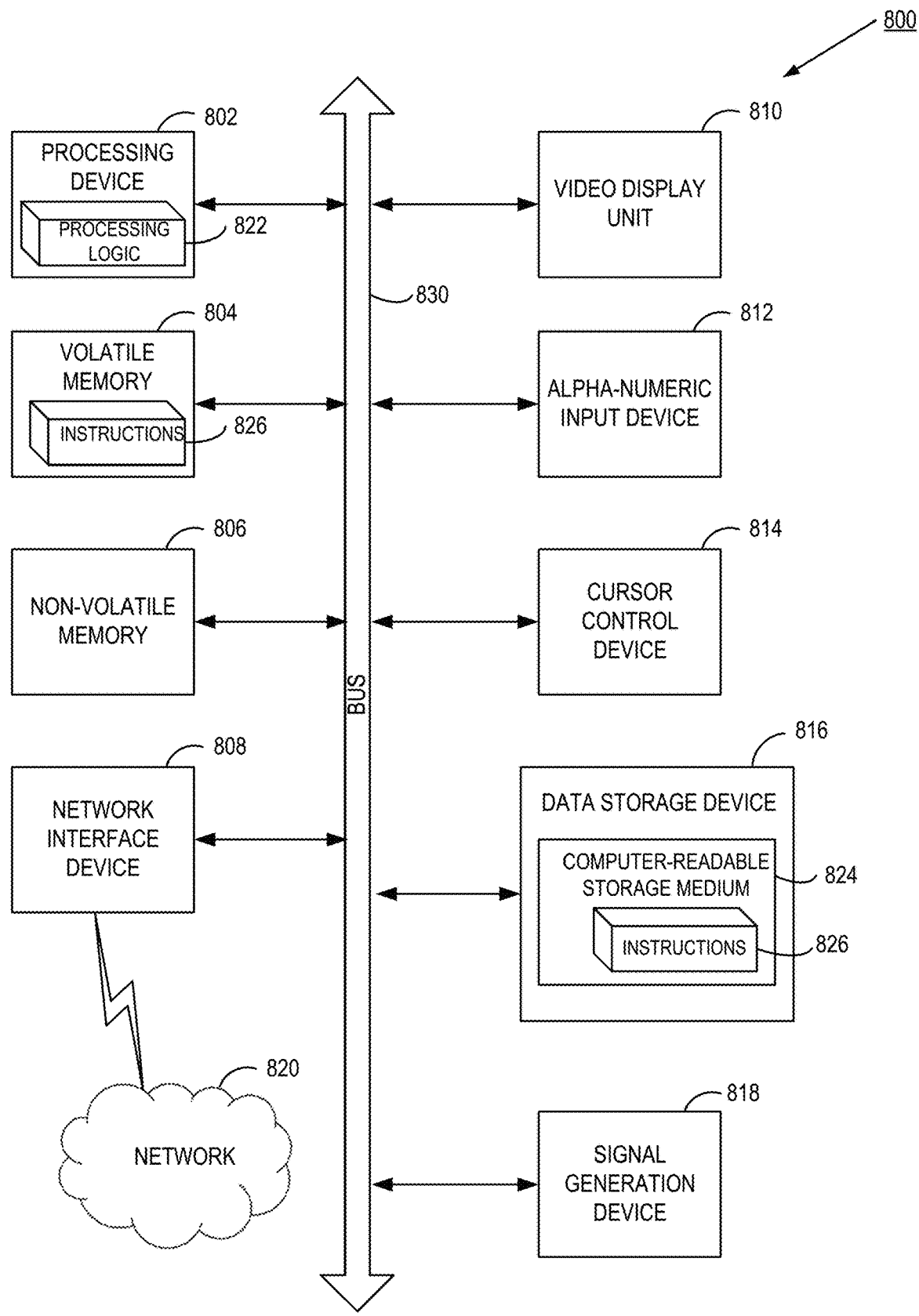
FIG. 8 is a block diagram illustrating an exemplary computer system, in accordance with aspects and embodiments of the present disclosure.

FIG. 8 is a block diagram illustrating an exemplary computer system 800, in accordance with aspects and embodiments of the present disclosure. The IC 100 described with respect to FIG. 1 can operate within the computer system 800. Computer system 800 can operate in the capacity of a server or an endpoint machine in an endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processing device (processor) 802, a main memory 804 (e.g., read-only memory (ROM), flash memory, dynamic random access memory (DRAM) such as synchronous DRAM (SDRAM), double data rate (DDR SDRAM), or DRAM (RDRAM), etc.), a static memory 806 (e.g., flash memory, static random access memory (SRAM), etc.), and a data storage device 818, which communicate with each other via a bus 840. In at least one embodiment, the processor 802 can be one of the IC 100 of FIG. 1 or the processor 200 of FIG. 2.

Processor (processing device) 802 represents one or more general-purpose processing devices such as a microprocessor, central processing unit, or the like. More particularly, the processor 802 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 802 can also be one or more special-purpose processing devices, such as an application-specific integrated circuit (ASIC), a field programmable gate array (FPGA), a digital signal processor (DSP), a network processor, or the like. The processor 802 is configured to execute instructions 826 for performing the operations discussed herein.

The computer system 800 can further include a network interface device 808. The computer system 800 also can include a video display unit 810 (e.g., a liquid crystal display (LCD) or a cathode ray tube (CRT)), an input device 812 (e.g., a keyboard, an alphanumeric keyboard, a motion sensing input device, touch screen), a cursor control device 814 (e.g., a mouse), and a signal generation device 818 (e.g., a speaker).

The data storage device 816 can include a non-transitory machine-readable storage medium 824 (also non-transitory computer-readable storage medium) on which is stored one or more sets of instructions 826 embodying any one or more of the methodologies or functions described herein. The instructions can also reside, completely or at least partially, within the main memory 804 and/or within the processor 802 during execution thereof by the computer system 800, the main memory 804, and the processor 802 also constituting machine-readable storage media. The instructions can further be transmitted or received over a network 830 via the network interface device 808.

In one implementation, the instructions 826 include instructions for reconfiguring a unified core processor into a multi-core processor or reconfiguring a multi-core processor into a unified core processor. While the computer-readable storage medium 824 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding, or carrying a set of instructions for execution by the machine and that causes the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, refer to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables the hardware to perform specific functions (e.g., generating interest points and/or descriptors); software on a computer-readable medium; or a combination thereof.

The aforementioned systems, circuits, modules, and so on have been described with respect to interaction between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A method for operating an integrated circuit (IC), the method comprising:
   executing a first thread in a first pipeline of a first core of the IC, the first core comprising a first set of hardware structures;
   executing a second thread in a second pipeline of a second core of the IC, the second core comprising a second set of hardware structures; and
   in response to a command to operate the IC with a unified core:
     unifying the first core with the second core to obtain the unified core, wherein unifying the first core with the second core comprises at least one of unifying the first pipeline with the second pipeline to obtain a unified pipeline or unifying the first set of hardware structures with the second set of hardware structures to obtain a unified set of hardware structures; and
     executing a single thread in the unified pipeline of the unified core using the unified set of hardware structures.

2. The method of claim 1, further comprising issuing the command to operate the IC with the unified core in response to determining that the second thread has been in an inactive state for more than a threshold number of clock cycles.

3. The method of claim 2, wherein the threshold number of clock cycles is a configurable parameter.

4. The method of claim 2, wherein the second core enters the inactive state in response to receiving an instruction that indicates the second thread is transitioning to the inactive state.

5. The method of claim 1, further comprising:
   saving at least one of an architectural state or a microarchitectural state of the first core to a side structure of the IC; and
   restoring at least one of the architectural state or the microarchitectural state of the first core to the unified core in response to unifying the first core and the second core.

6. The method of claim 1, wherein unifying the first set of hardware structures with the second set of hardware structures to obtain the unified set of hardware structures comprises reconfiguring the IC to allow the unified core to allocate entries to the first set of hardware structures and the second set of hardware structures.

7. The method of claim 1, wherein unifying the first set of hardware structures with the second set of hardware structures to obtain the unified set of hardware structures comprises modifying wrapping pointers associated with the first set of hardware structures and the second set of hardware structures such that the first thread may allocate to each entry of the unified set of hardware structures.

8. The method of claim 1, further comprising flushing the first pipeline in response to the command to operate the IC with the unified core.

9. The method of claim 8, wherein flushing the first pipeline comprises at least one of flushing instructions currently present within the first pipeline or flushing one or more hardware structures of the first set of hardware structures.

10. The method of claim 1, wherein the first set of hardware structures and the second set of hardware structures each comprise one or more caches, translation lookaside buffers (TLB), register files, queues associated with various stages of the first pipeline and the second pipeline respectively, branch predictors, branch target buffers, execution units, prefetchers, and schedulers.

11. A processor comprising at least a first core and a second core of a plurality of cores, the first core corresponding to a first pipeline and a first set of hardware structures, and the second core corresponding to a second pipeline and a second set of hardware structures, wherein the processor is to:
execute a first thread in the first pipeline of the first core;
execute a second thread in the second pipeline of the second core;
in response to a command to operate the processor with a unified core, unify the first core with the second core to obtain the unified core, wherein the unified core comprises at least one of a unified pipeline comprising the first pipeline and the second pipeline or a unified set of hardware structures comprising the first set of hardware structures and the second set of hardware structures; and
execute a single thread in the unified pipeline of the unified core using the unified set of hardware structures.

12. The processor of claim 11, wherein the command to operate the processor with the unified core is issued in response to a determination that the second thread has been in an inactive state for more than a threshold number of clock cycles.

13. The processor of claim 12, wherein the threshold number of clock cycles is a configurable parameter.

14. The processor of claim 12, wherein the second core enters the inactive state in response to reception of an instruction that indicates the second thread is transitioning into the inactive state.

15. The processor of claim 11, wherein the processor is further to:
save at least one of an architectural state or a microarchitectural state of the first core to a side structure of the processor; and
restore at least one of the architectural state or the microarchitectural state of the first core to the unified core in response to the unification of the first core and the second core.

16. The processor of claim 11, wherein the unification of the first core with the second core comprises a reconfiguration of the processor to allow the unified core to allocate entries to the first set of hardware structures and the second set of hardware structures.

17. The processor of claim 11, wherein the unification of the first core with the second core comprises a modification of wrapping pointers associated with the first set of hardware structures and the second set of hardware structures such that the first thread may allocate to each entry of the unified set of hardware structures.

18. The processor of claim 11, wherein in response to a command to operate the processor with a unified core, the processor is further to flush the first pipeline.

19. The processor of claim 18, wherein to flush the first pipeline, the processor is to flush at least one of instructions currently present within the first pipeline or one or more hardware structures of the first set of hardware structures.

20. The processor of claim 11, wherein the first set of hardware structures and the second set of hardware structures each comprise one or more caches, translation lookaside buffers (TLB), register files, queues associated with various stages of the first pipeline and the second pipeline respectively, branch predictors, branch target buffers, execution units, prefetchers, and schedulers.

21. A system comprising:
a memory subsystem; and
a processing device coupled to the memory subsystem, wherein the processing device is to:
execute a first thread in a first pipeline of a first core of the processing device, the first core comprising a first set of hardware structures;
execute a second thread in a second pipeline of a second core of the processing device, the second core comprising a second set of hardware structures; and
in response to a command to operate the processing device with a unified core:
unify the first core with the second core to obtain the unified core, wherein to unify the first core with the second core, the processing device is to unify at least one of the first pipeline with the second pipeline to obtain a unified pipeline or the first set of hardware structures with the second set of hardware structures to obtain a unified set of hardware structures; and
execute a single thread in the unified pipeline of the unified core using the unified set of hardware structures.

* * * * *